US009038067B2

(12) United States Patent
Miki et al.

(10) Patent No.: US 9,038,067 B2
(45) Date of Patent: May 19, 2015

(54) VIRTUAL COMPUTER SYSTEM AND CONTROL METHOD OF MIGRATING VIRTUAL COMPUTER

(71) Applicant: Hitachi, Ltd., Tokyo (JP)

(72) Inventors: Hiroshi Miki, Hadano (JP); Eiichiro Oiwa, Kawasaki (JP); Yukari Hatta, Hadano (JP); Norimitsu Hayakawa, Inagi (JP); Takuji Teraya, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 13/659,107

(22) Filed: Oct. 24, 2012

(65) Prior Publication Data

US 2013/0152083 A1 Jun. 13, 2013

(30) Foreign Application Priority Data

Dec. 13, 2011 (JP) .................................. 2011-271839

(51) Int. Cl.
*G06F 9/455* (2006.01)
*G06F 9/48* (2006.01)
*G06F 9/50* (2006.01)

(52) U.S. Cl.
CPC ...... *G06F 9/5088* (2013.01); *G06F 2009/4557* (2013.01); *G06F 9/4856* (2013.01); *G06F 9/5077* (2013.01)

(58) Field of Classification Search
None
See application file for complete search history.

(56) References Cited

U.S. PATENT DOCUMENTS

| 7,783,788 | B1 | 8/2010 | Quinn et al. |
| 2009/0144389 | A1 | 6/2009 | Sakuta |
| 2010/0031258 | A1 | 2/2010 | Takano et al. |
| 2012/0131576 | A1 | 5/2012 | Hatta et al. |

FOREIGN PATENT DOCUMENTS

| EP | 2 166 449 | 3/2010 |
| EP | 2 151 756 | 10/2010 |
| JP | 2010-033404 A | 2/2010 |
| JP | 2011-186967 A | 9/2011 |

OTHER PUBLICATIONS

Extended European Search Report in EP App. No. 12190713.3-1954, dated Apr. 9, 2013.

*Primary Examiner* — Qing Wu
(74) *Attorney, Agent, or Firm* — Mattingly & Malur, PC

(57) ABSTRACT

A live migration in a virtual computer system. On a source physical computer, the control information area of the source logical FC-HBA (managed by an OS) is copied to the control information area of a dummy logical FC-HBA managed by a hypervisor. After an FC login to the dummy FC-HBA, an address conversion table is rewritten so that a host physical address for referring to the control information area of a logical HBA1' can be referred to using a guest logical address for referring to the control information area of the source FC-HBA. After the FC logout of the source FC-HBA, using a WWN of the FC used for the FC logout, a login to the destination logic FC-HBA is performed. Next, the OS on the source computer is taken over by the destination computer. Therefore, the disk accessed on the source computer can be accessed from the destination FC-HBA.

16 Claims, 30 Drawing Sheets

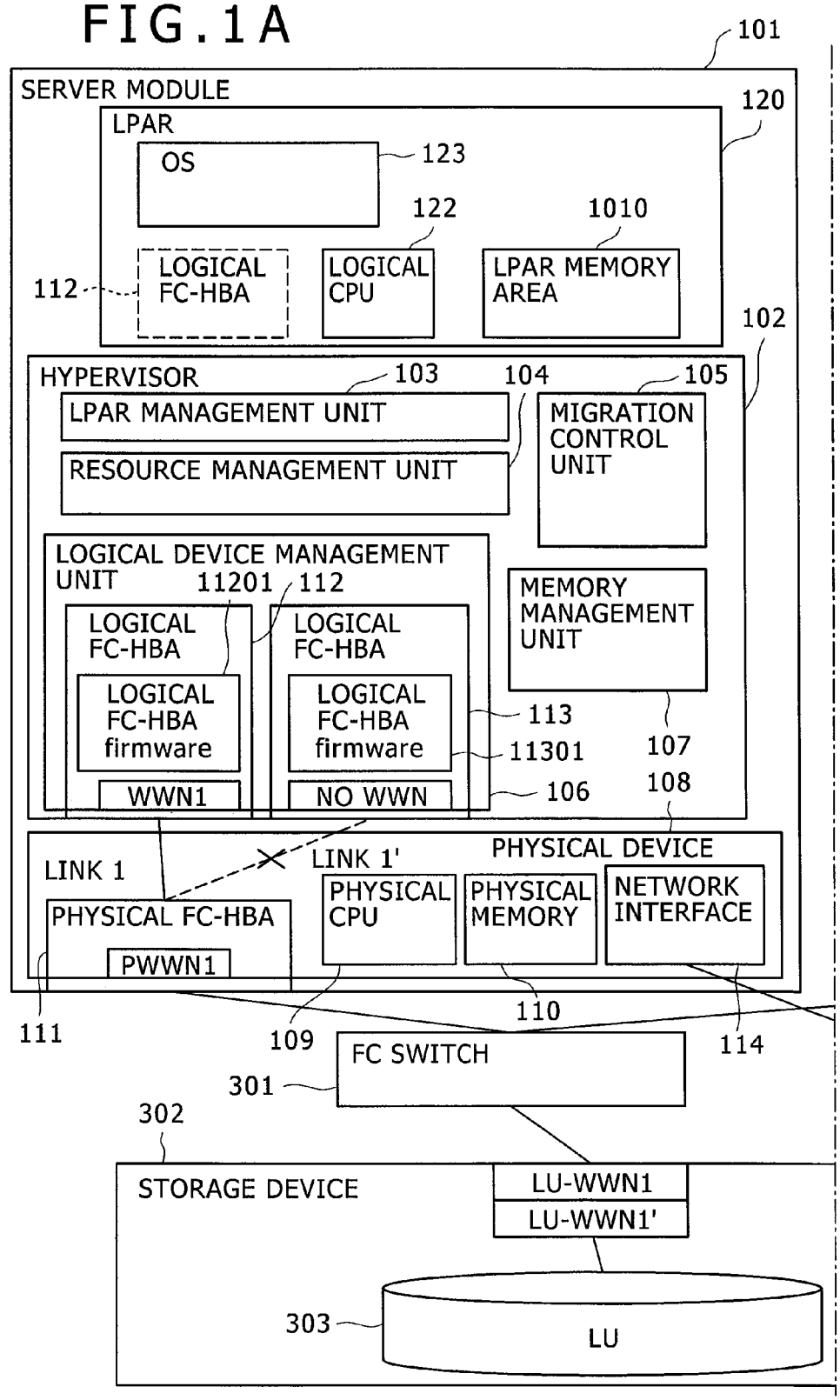

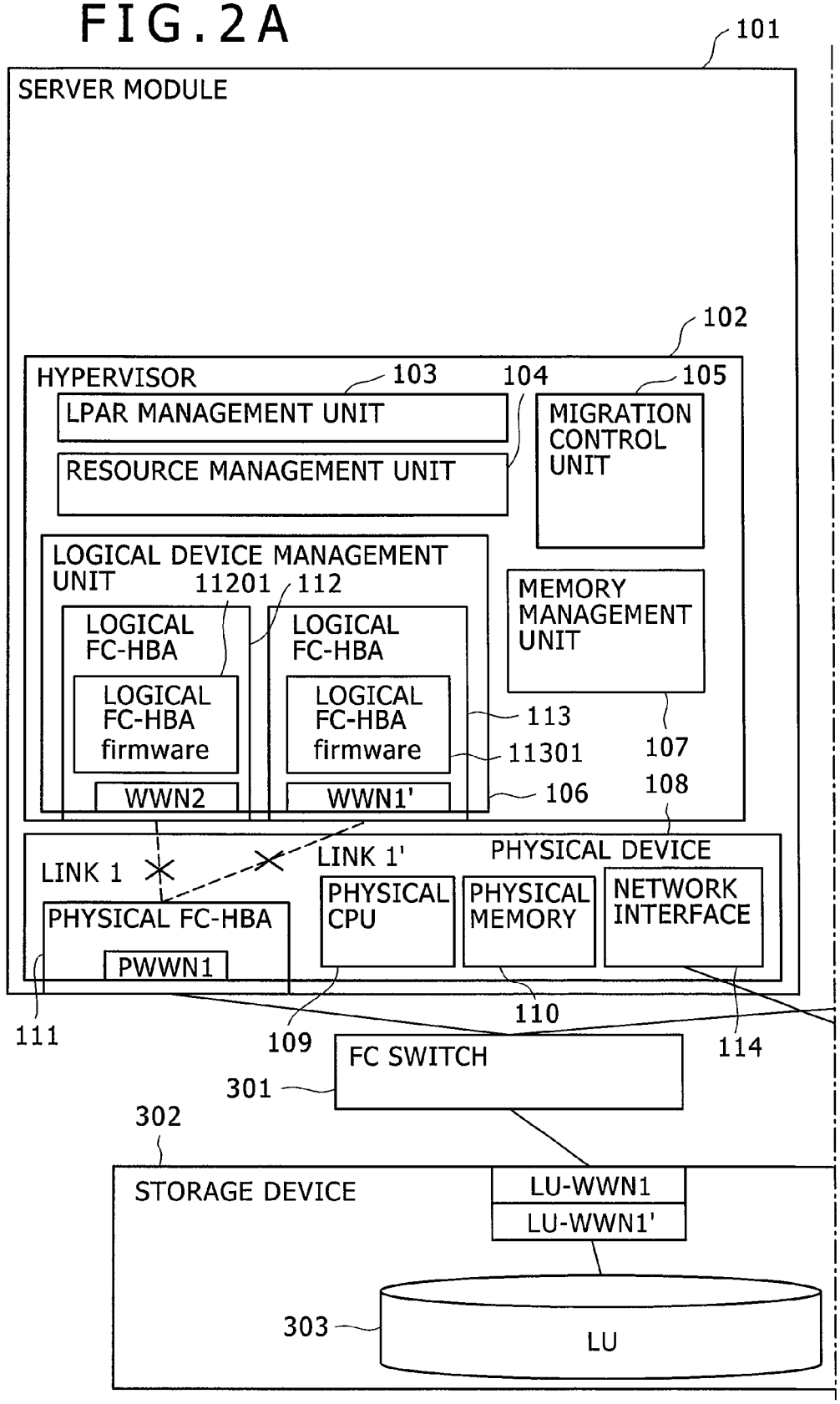

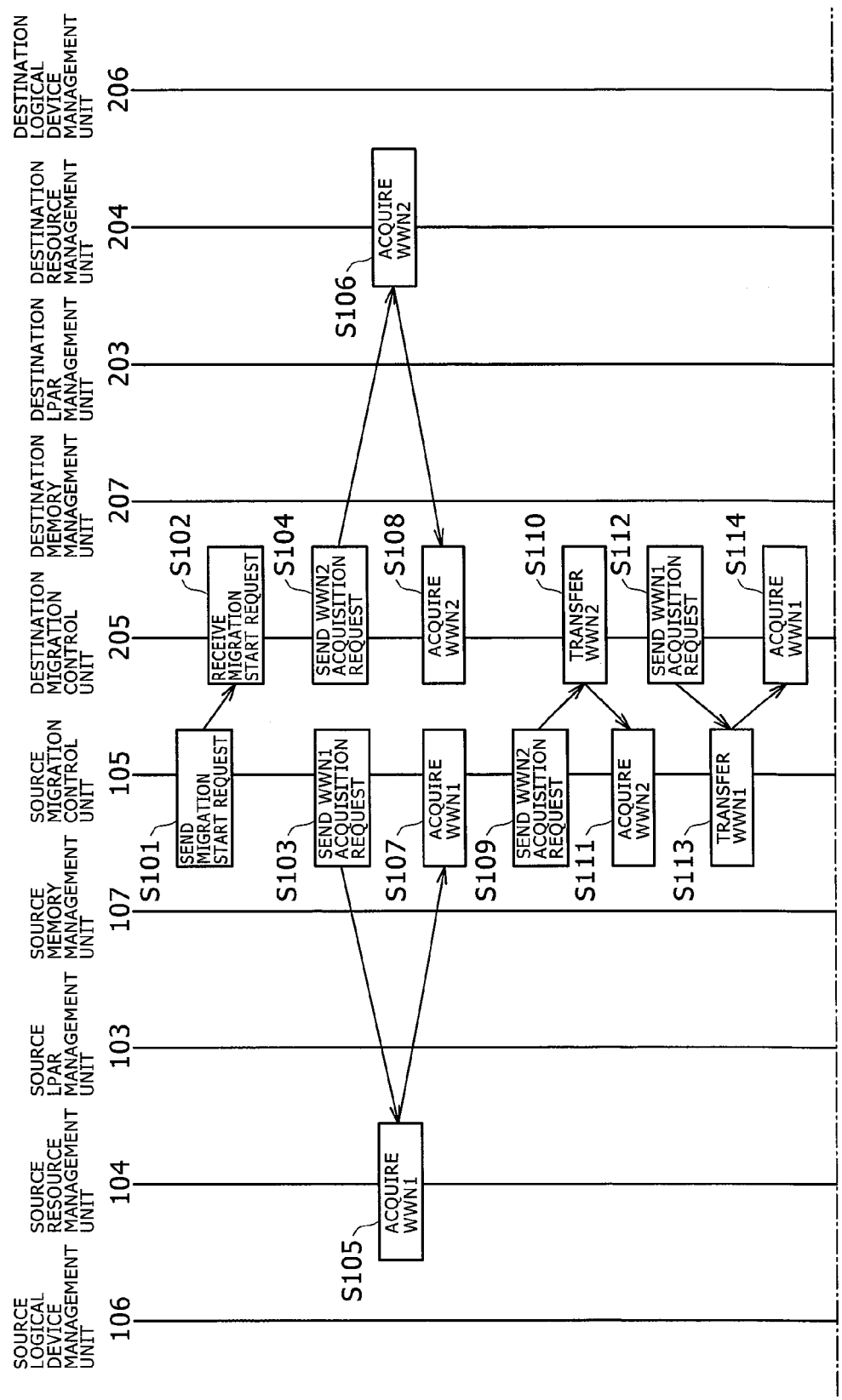

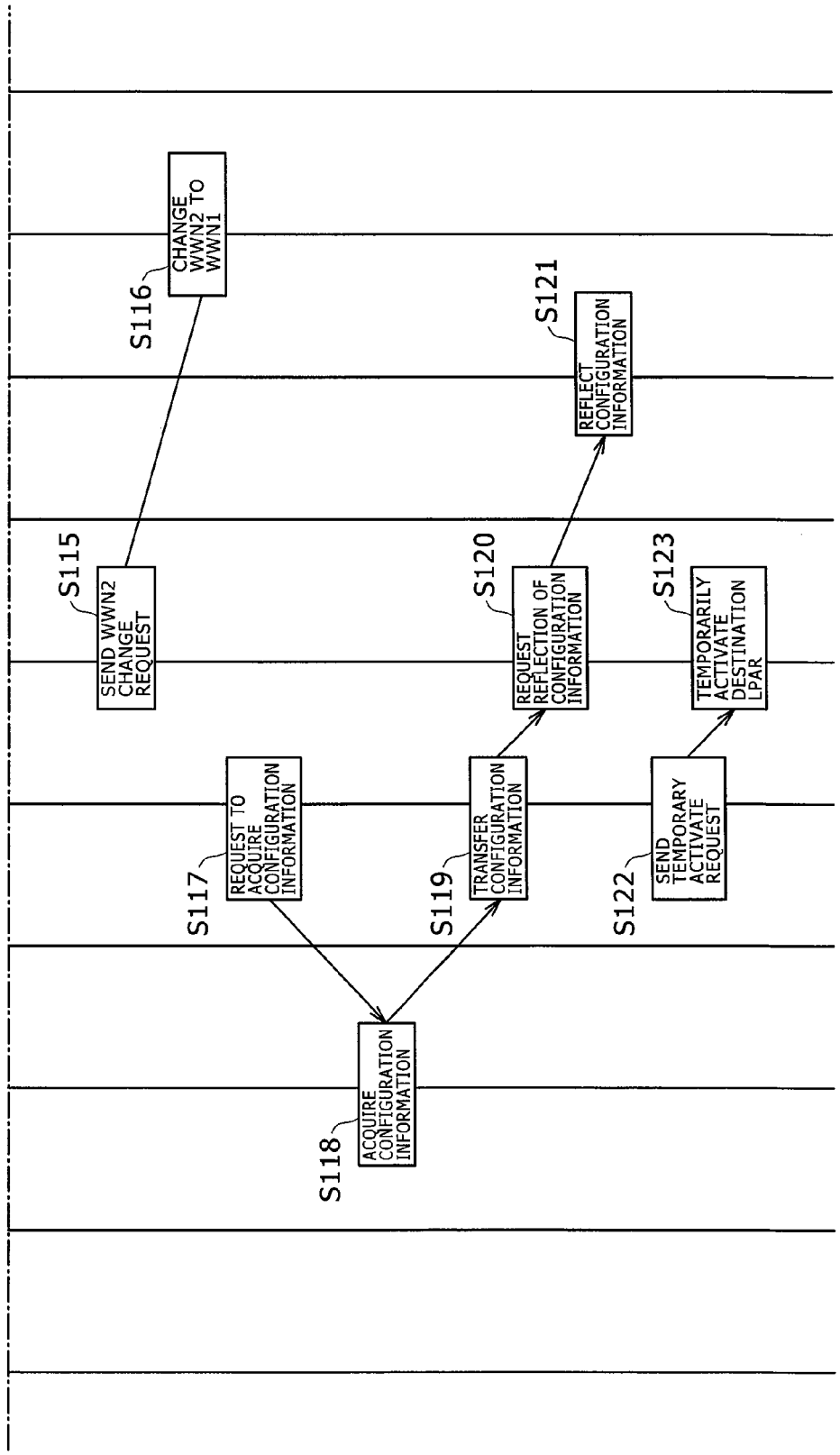

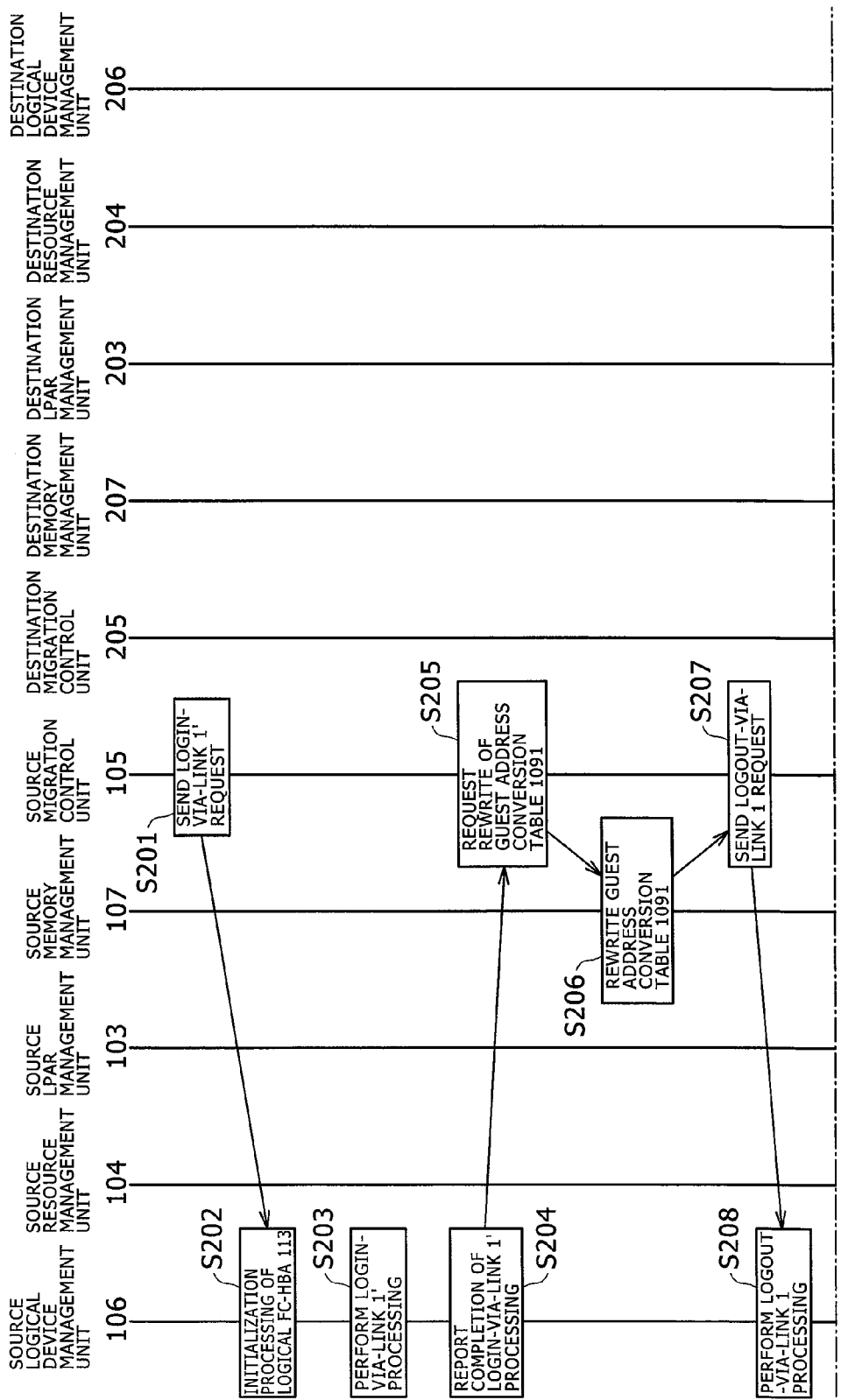

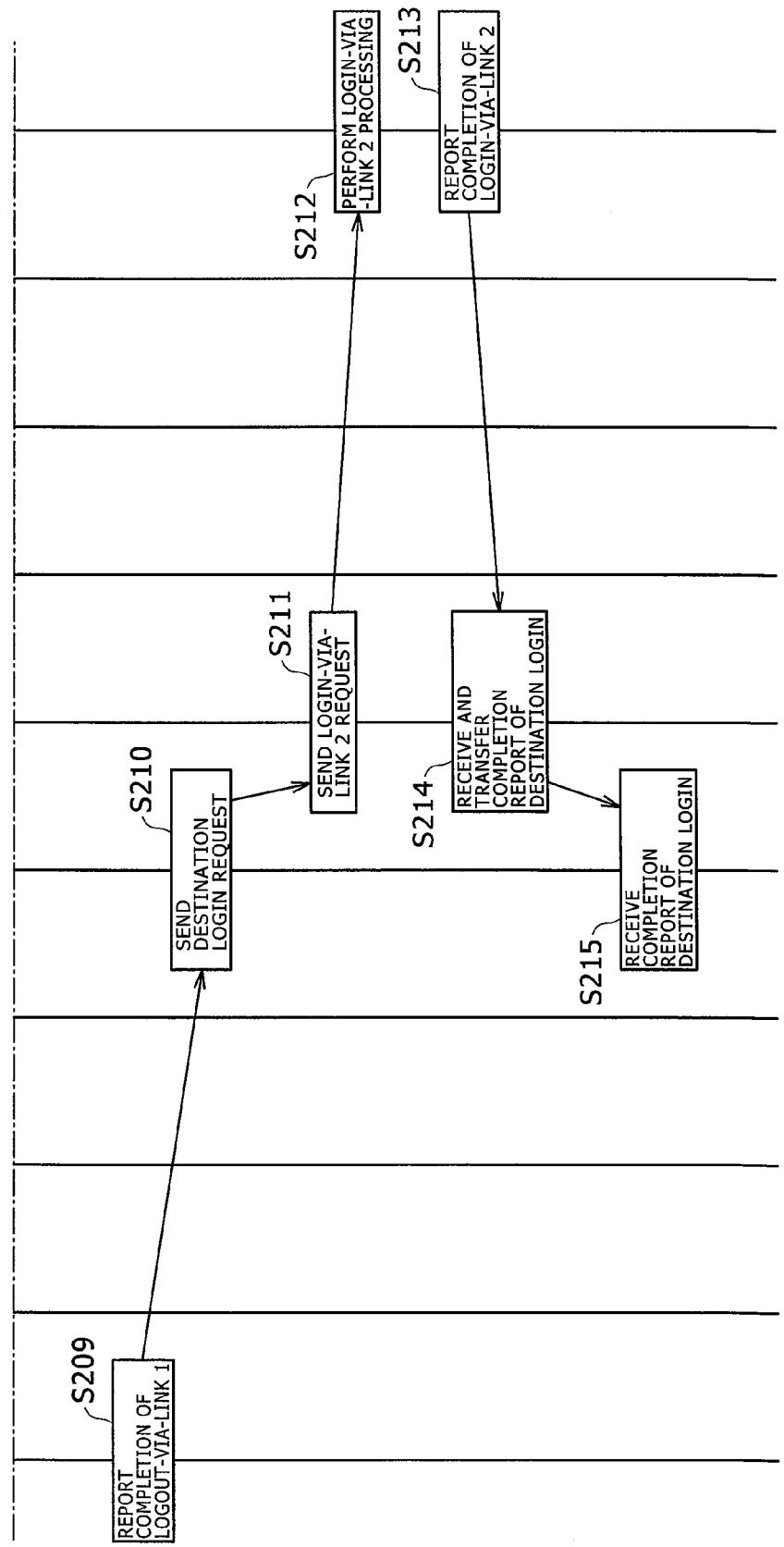

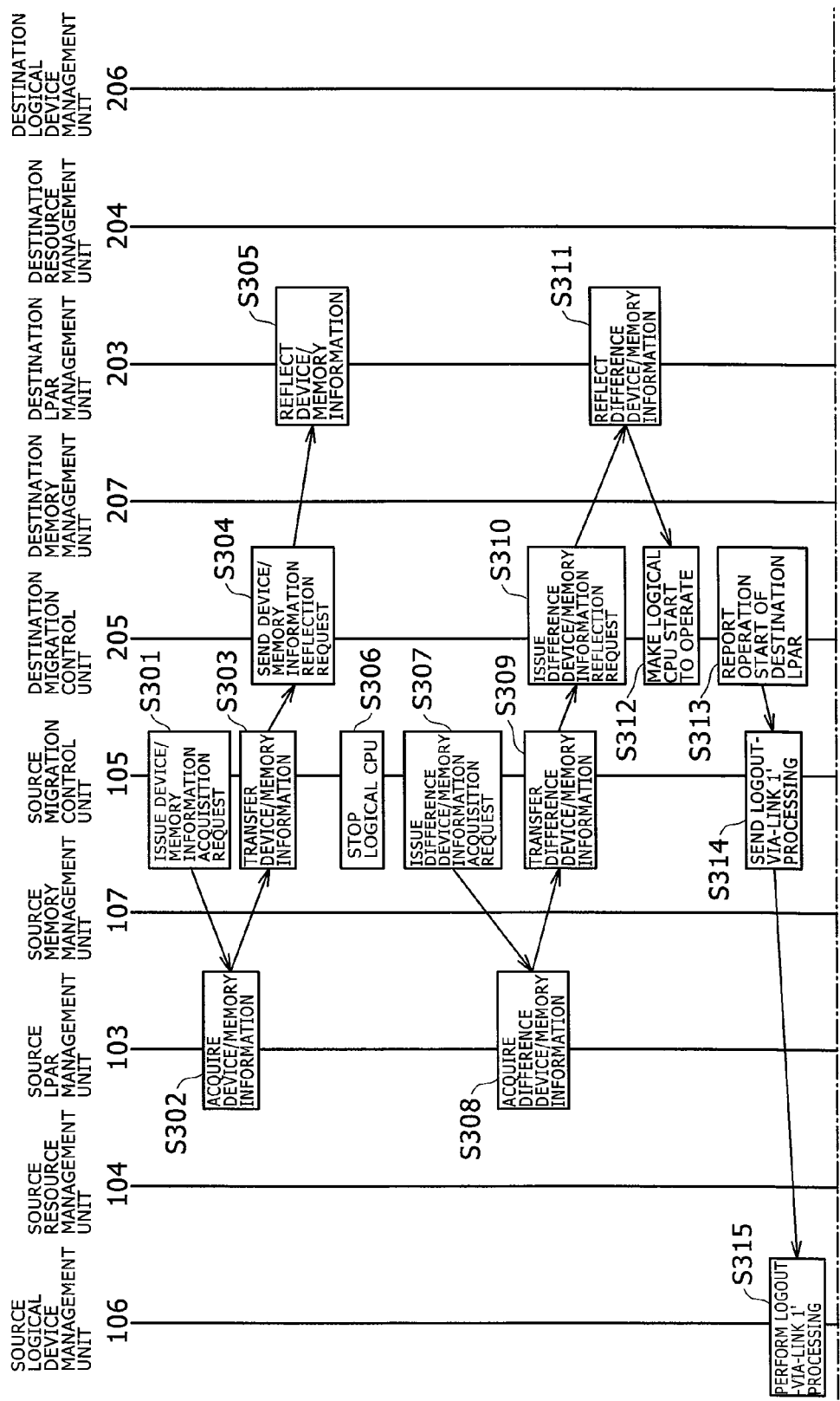

FIG.10

<SOURCE> WWN MANAGEMENT TABLE
(BEFORE MIGRATION, BEFORE CHANGE OF
DESTINATION WWN)                                    1096

| LOGICAL FC-HBA TO WHICH WWN IS ASSIGNED | WWN TO BE ASSIGNED | |
|---|---|---|
| LOGICAL FC-HBA 112 | WWN1 | 0x2300000011111111 |
| LOGICAL FC-HBA 113 | WWN1' | 0x2380000011111111 |

<DESTINATION> WWN MANAGEMENT TABLE
(BEFORE MIGRATION, BEFORE CHANGE OF
DESTINATION WWN)                                    2096

| LOGICAL FC-HBA TO WHICH WWN IS ASSIGNED | WWN TO BE ASSIGNED | |
|---|---|---|
| LOGICAL FC-HBA 212 | WWN2 | 0x2300000022222222 |
|  |  |  |

FIG.11

<SOURCE> WWN MANAGEMENT TABLE 1096
(AFTER CHANGE OF DESTINATION WWN)

| LOGICAL FC-HBA TO WHICH WWN IS ASSIGNED | WWN TO BE ASSIGNED | |
|---|---|---|
| LOGICAL FC-HBA 112 | WWN1 | 0x2300000011111111 |
| LOGICAL FC-HBA 113 | WWN1' | 0x2380000011111111 |

<DESTINATION> WWN MANAGEMENT TABLE 2096
(AFTER CHANGE OF DESTINATION WWN)

| LOGICAL FC-HBA TO WHICH WWN IS ASSIGNED | WWN TO BE ASSIGNED | |
|---|---|---|
| LOGICAL FC-HBA 212 | WWN1 | 0x2300000011111111 |
|  |  |  |

FIG.12

<BEFORE FC PATH SWITCHING>  1091

|  | GUEST LOGICAL ADDRESS | HOST PHYSICAL ADDRESS |
|---|---|---|
| ADDRESS 1 | 0x4000 | 0x1000 |
| ... | ... | ... |
| ADDRESS ff | 0x40ff | 0x10ff |
| ADDRESS 100 (LOGICAL FC-HBA 112 CONTROL AREA 1012) | 0x4100 | 0x1100 |

FIG.13

<AFTER FC PATH SWITCHING>  1091

|  | GUEST LOGICAL ADDRESS | HOST PHYSICAL ADDRESS |
|---|---|---|
| ADDRESS 1 | 0x4000 | 0x1000 |
| ... | ... | ... |
| ADDRESS ff | 0x40ff | 0x10ff |
| ADDRESS 100 (LOGICAL FC-HBA 112 CONTROL AREA 1012) | 0x4100 | 0xff00 |

FIG.19

<SOURCE> WWN MANAGEMENT TABLE　　　　　　　　　　1096
(AFTER CHANGE OF SOURCE WWN)

| LOGICAL FC-HBA TO WHICH WWN IS ASSIGNED | WWN TO BE ASSIGNED | |
|---|---|---|
| LOGICAL FC-HBA 112 | WWN2 | 0x2300000022222222 |
| LOGICAL FC-HBA 113 | WWN1' | 0x2380000011111111 |

<DESTINATION> WWN MANAGEMENT TABLE　　　　　　2096
(AFTER CHANGE OF SOURCE WWN)

| LOGICAL FC-HBA TO WHICH WWN IS ASSIGNED | WWN TO BE ASSIGNED | |
|---|---|---|
| LOGICAL FC-HBA 212 | WWN1 | 0x2300000011111111 |
|  |  |  |

| LOGICAL FC-HBA | STATE |
|---|---|
| LOGICAL FC-HBA 112 | COMPLETION STATE OF LOGIN |
| LOGICAL FC-HBA 113 | STATE OF LOGOUT |

| VIRTUAL PORT IDENTIFIER | RELATIVE ADDRESS OF FC-HBA CONTROL AREA |
|---|---|
| VIRTUAL PORT 11011 | 0x0100 |
| VIRTUAL PORT 11012 | 0x0f00 |

| VIRTUAL PORT IDENTIFIER | LPAR TO WHICH VIRTUAL PORT IS ASSIGNED | HOST PHYSICAL ADDRESS OF LPAR TO WHICH VIRTUAL PORT IS ASSIGNED |
|---|---|---|
| VIRTUAL PORT 11011 | LPAR120 | 0x1000 |
| VIRTUAL PORT 11012 | HYPERVISOR 102 | 0xf000 |

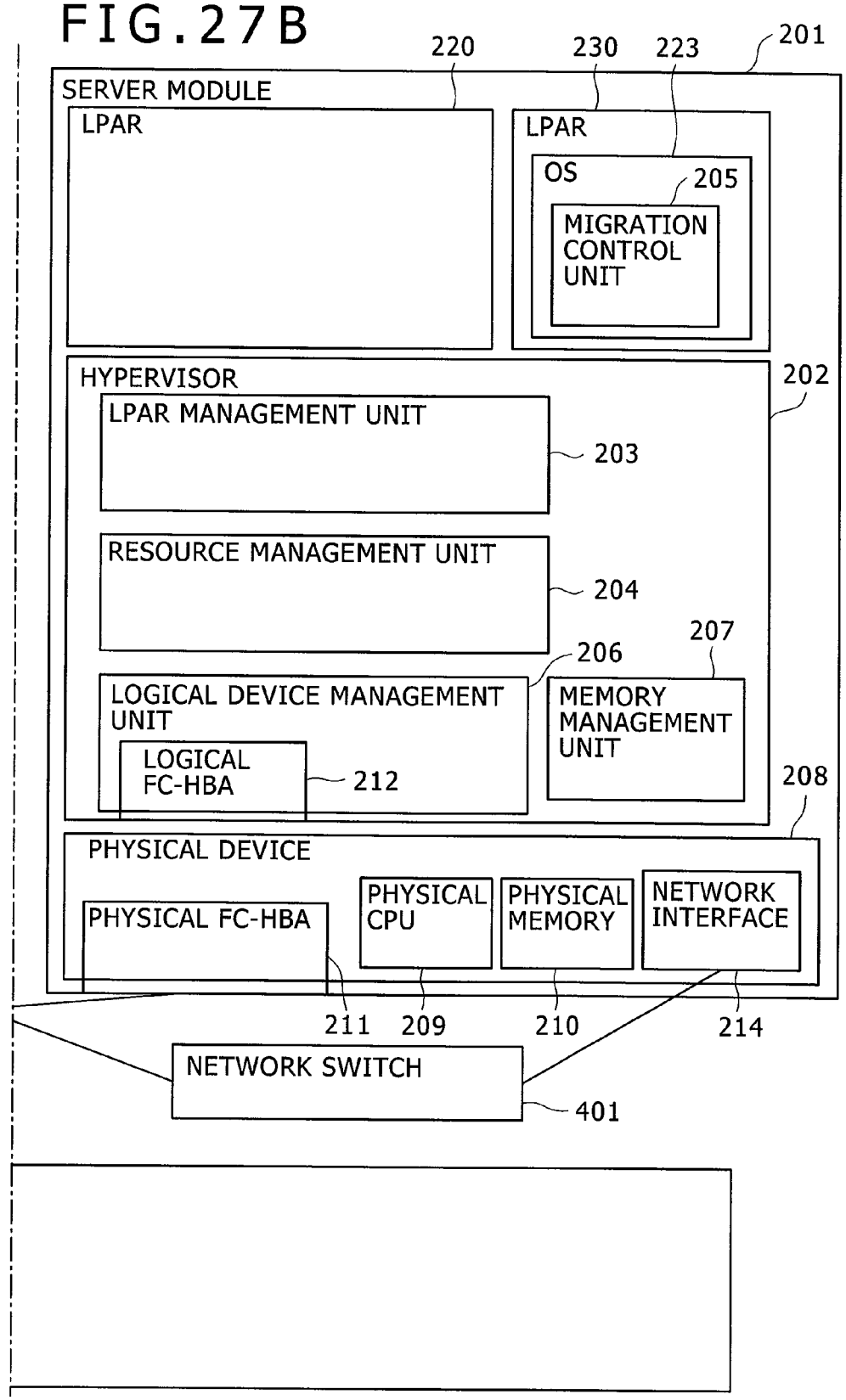

VIRTUAL COMPUTER SYSTEM AND CONTROL METHOD OF MIGRATING VIRTUAL COMPUTER

CLAIM OF PRIORITY

The present application claims priority from Japanese patent application JP 2011-271839 filed on Dec. 13, 2011, the content of which is hereby incorporated by reference into this application.

FIELD OF THE INVENTION

The present invention relates to a method of migrating a logical partition operating on a physical computer to a logical partition on another physical computer, and a computer system that employs the method.

BACKGROUND OF THE INVENTION

There has been put into practical use a virtual computer system in which plural logical partitions (hereinafter, referred to as LPARs) are established on a physical computer and OSs (operating systems) are allowed to operate on the respective LPARs, thereby allowing the plural OSs unique to the respective LPARs to operate.

There are two I/O processing mode-one is an emulation mode in which a hypervisor converts I/O instructions issued by an OS into instructions interpretable by a physical I/O device, and the other is an I/O pass-through mode in which I/O instructions issued by an OS are directly executed by a physical I/O device.

In addition, as a recent type of virtual computer system, a virtual computer system in which a logical FC (Fibre Channel) port is assigned to each LPAR in the I/O pass-through mode has been used under an SAN (Storage Area Network) environment including a RAID apparatus. The I/O pass-through mode is a mode in which an I/O is directly issued from the logical FC port of each LPAR to the SAN.

In a computer system to realize booting under the SAN environment, in order to protect data of LUs (logical units), in which OSs are installed, in a memory device of a RAID apparatus and the like, a security function by which an access is permitted only from the respective computers is realized by the memory device. The security function generally utilizes a method in which, by using unique IDs (World Wide Names) assigned to the FC ports mounted to the respective computers, the logical units having the OSs installed are associated with the unique IDs (World Wide Names) assigned to the FC ports provided for the computers, and an FC port having an unique ID (World Wide Name) is permitted to access only a logical unit associated with the unique ID. Further, there are some cases in which the IDs (World Wide Names) unique to the apparatuses are recorded in software including OSs.

In the computer system to perform booting under the SAN environment, the unique IDs (World Wide Names) assigned to the FC ports of a currently-used computer are different from those assigned to the FC ports of a standby computer. Accordingly, when an actually-used computer is migrated to a standby computer, software images including OSs cannot be used as they are, and it is necessary to change the setting of the security function on the memory device side by SAN management software or a system administrator. The setting change is required not only between the physical computers such as the currently-used computer and the standby computer, but also between virtual computer systems in each of which logical FC ports are respectively assigned to LPARs in the I/O pass-through mode.

About migration processing of an LPAR, Japanese Unexamined Patent Application Publication No. 2010-33404 discloses a technique in which, in the case where a virtual computer operating on a real computer is migrated onto another real computer, a management unit stops the source virtual computer from operating, defines a destination virtual computer on the another real computer, changes configuration information concerning the source virtual computer and configuration information concerning the destination virtual computer while the destination virtual computer is kept stopped from starting, and after the configuration information concerning both virtual computers are changed, the destination virtual computer is allowed to start.

SUMMARY OF THE INVENTION

Among many types of LPAR migration processing, migration processing in which the state where an OS on a source LPAR is operating is taken over by a destination LPAR, and the OS is allowed to continuously operate on the destination LPAR is called live migration processing. In the LPAR live migration processing, an access path from an OS to be migrated to a memory device is switched from a path that passes through the physical I/O device of the source LPAR to a path that passes through the physical I/O device of the destination LPAR.

In the LPAR live migration processing in which a hyper visor emulation mode is employed as an I/O processing mode, a hypervisor traps an I/O command, and performs I/O access path switching processing concerning the LPAR live migration.

On the other hand, in the LPAR live migration processing in which an I/O pass-through mode is employed as an I/O processing mode, in order that an OS that is migrated from a source LPAR to a destination LPAR accesses the same disk in a memory device, the OS has to login to the same LU.

However, it takes 30 seconds at a maximum for the OS to login to or logout from an LU for example. Therefore, because there is a possibility that a time period during which the OS cannot access the disk is generated when the OS logouts from an LU on the source computer and logins to the LU on the destination computer after the operation of the OS is taken over by the destination computer, a migration in which the OS is allowed to continuously operate while the OS is being taken over by the destination computer, that is, the live migration cannot be achieved.

As a technique to prevent a time period during which an OS cannot access a disk from being generated, a technique has been proposed in which, after an FC path to be used when the OS logins to a source LPAR, and an FC path to be used when the OS logins to a destination LPAR are prepared in advance, the former path is switched to the latter path during the live migration processing of these LPAR. However, in the SAN security, it is not permitted that the same WWN (World Wide Name) is redundantly used by different FC ports, and plural different FC ports login with the use of the same WWN to the same LU in a computer system.

In addition, OSs that operate on the x86 architecture used by Windows (registered trademark), Linux (registered trademark), and the like do not include any FC path switching module as a default. Therefore, such OSs cannot deal with the FC path switching processing concerning a live migration.

In addition, let's say that an FC path switching module for a common PC path redundant configuration is applied to a live migration. In this case, because the FC path switching module assumes a situation in which an FC path switching is performed at the time of failure, there is a possibility that the FC path switching module falsely recognizes a normal FC path switching performed in the live migration as an FC path failure, and performs failure processing.

The present invention was achieved with the above-mentioned problems in mind, and an object of the present invention is to provide a virtual computer system that realizes LPAR live migration with the use of an I/O pass-through mode, and a method for migrating a virtual computer used in the virtual computer system.

In order to solve the above-mentioned problems, an embodiment of the present invention proposes the following control method of migrating a virtual computer in a virtual computer system having the following configuration. The virtual computer system includes a plurality of physical computers on which virtual computers are operating with the help of a hypervisor, and a memory device. The plurality of physical computers include a first physical computer and a second physical computer. The first physical computer includes: a first physical HBA; a first hypervisor that creates a first logical HBA and a first' logical HBA by dividing the first physical HBA; a first virtual computer to which the first logical HBA that is given a WWN (World Wide Name) 1 is assigned and on which an OS that accesses the memory device via a link 1 that connects the first logical HBA and the memory device operates; and an address conversion table that manages a correspondent relation of the guest logical address of the first virtual computer to the host physical address of the first physical computer. The first hypervisor rewrites a first host physical address corresponding a guest logical address showing the control area of the first logical HBA into a first' host physical address showing the control area of the first' logical HBA with the use of the address conversion table when the first virtual computer is migrated onto the second physical computer. The OS operating on the first virtual computer accesses the memory device with the use of the rewritten address conversion table via a link 1' that connects the first' logical HBA and the memory device while the first virtual computer is being migrated onto the second physical computer. The second physical computer includes: a second physical HBA; a second hypervisor that creates a second logical HBA by dividing the second physical HBA; and a second virtual computer to which the second logical HBA is assigned, on which the OS that is migrated from the first virtual computer operates, and which is created on the basis of configuration information concerning the first virtual computer. The OS operating on the second virtual computer accesses the memory device via a link 2 that connects the second logical HBA that is given the WWN 1 and the memory device.

According to the present invention, even in a virtual computer system in which an I/O pass-through mode is employed as an I/O processing mode, a live migration in which an operation is taken over by the second virtual computer while the first virtual computer is operating can be achieved.

BRIEF DESCRIPTION OF THE DRAWINGS

FIG. 1A and FIG. 1B are an overall block diagram of a virtual computer system before migration processing;

FIG. 2A and FIG. 2B are an overall block diagram of the virtual computer system after the migration processing;

FIG. 5A and FIG. 5B are a sequence diagram of live migration processing-front part;

FIG. 6A and FIG. 6B are a sequence diagram of the live migration processing-middle part;

FIG. 7A and FIG. 7B are a sequence diagram of the live migration processing-rear part;

FIG. 10 is a WWN management table before the live migration processing;

FIG. 11 is the WWN management table after a destination WWN is changed;

FIG. 12 is a conversion table before FC path switching;

FIG. 13 is the conversion table after the FC path switching.

FIG. 19 is the WWN management table after changing a source WWN;

FIG. 21 is the FC login status management table before the login-via-the-link 1';

FIG. 22 is a logical FC-HBA control area list;

FIG. 23 is an offset addition table;

FIG. 27A and FIG. 27B are an overall block diagram of a virtual computer system including two migration control units that are respectively located in two LPARs.

DETAILED DESCRIPTION OF THE PREFERRED EMBODIMENT

A virtual computer system to which an embodiment of the present invention is applied will be described in detail with reference to the drawings. In the description of this embodiment, live migration processing, in which an LPAR 120 operating on a first server module 101 is migrated onto a second server module 201 while the LPAR 120 is kept operating, and the LPAR migrated on the second server module 201 is made to continuously operate, will be described.

Figure 1B:
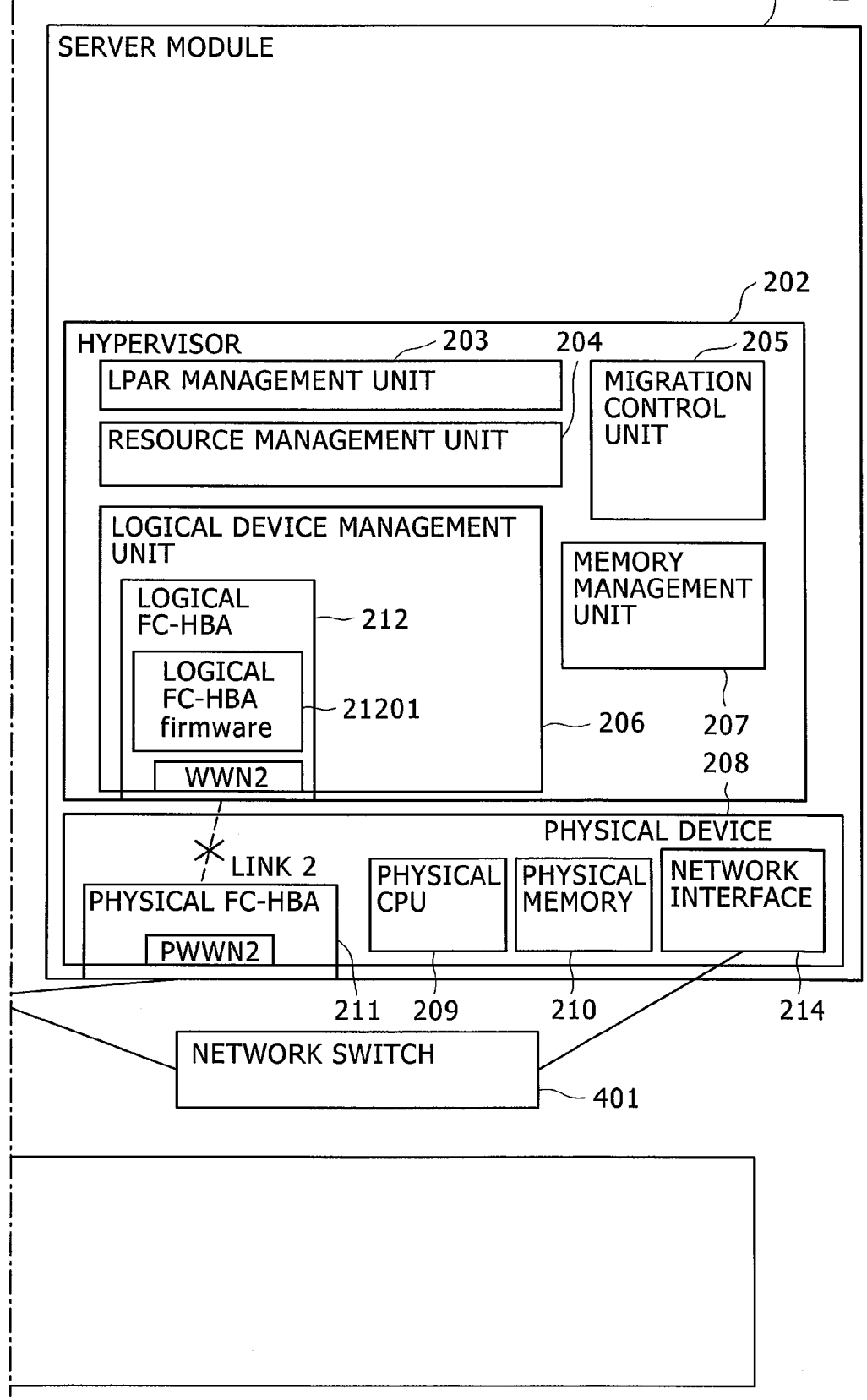
Figure 2B:
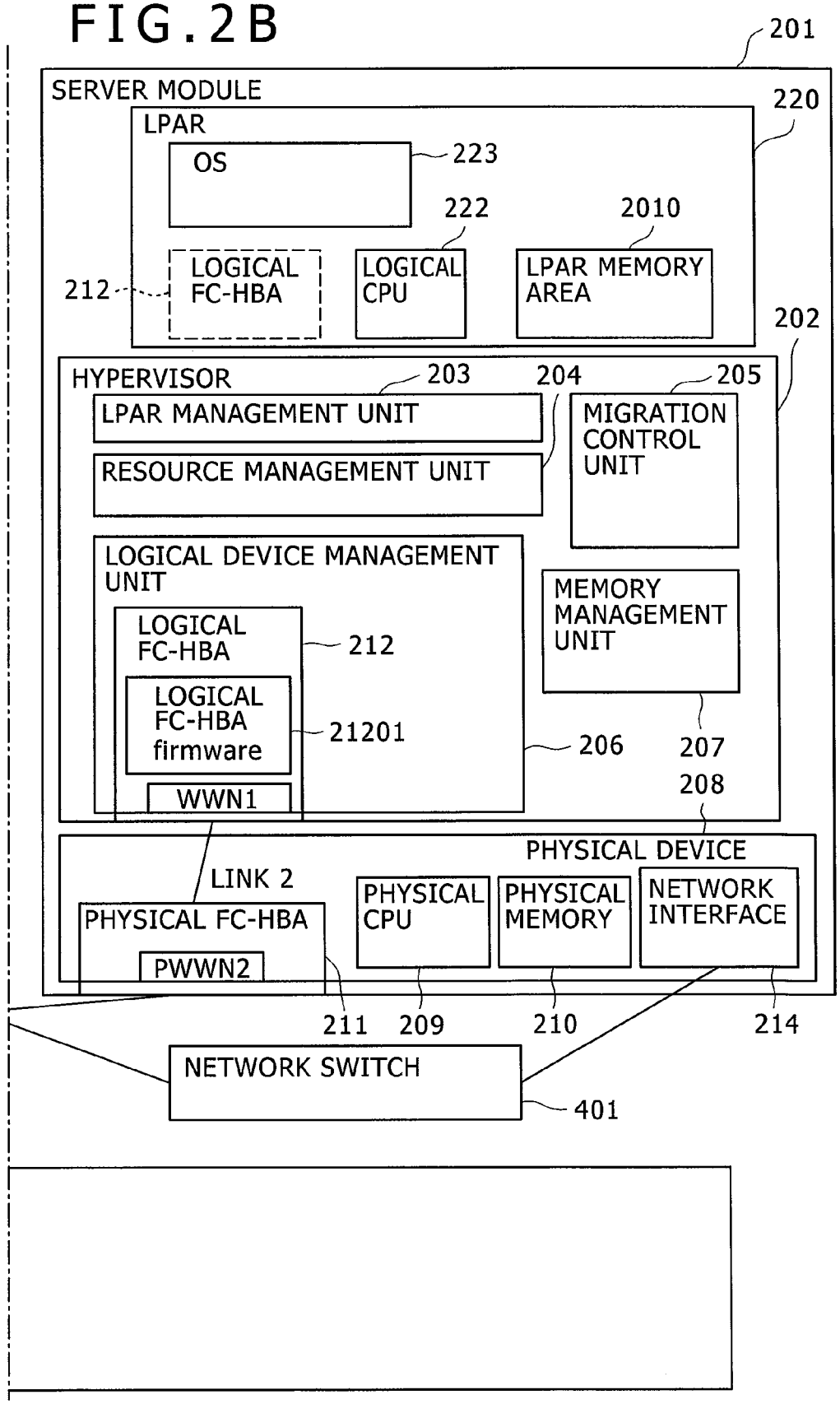

Here, an overall block diagram of the virtual computer system before migration processing is shown in FIG. 1A and FIG. 1B, and an overall block diagram of the virtual computer system after the live migration processing is shown in FIG. 2A and FIG. 2B.

The server modules 101 and 201 respectively include physical FC-HBAs 111 and 211, physical CPUs 109 and 209, physical memories 110 and 210, and network interfaces 114 and 214 as physical devices 108 and 208. The physical FC-HBA 111 and the physical FC-HBA 211 respectively include a PWWN (Physical World Wide Name) 1 and a PWWN (Physical World Wide Name) 2 as unique HBA addresses for their FC ports on a one-on-one basis.

Hypervisors 102 and 202 respectively divide physical resources of the server modules 101 and 201 in a logical fashion in order for plural LPARs to operate on the corresponding hypervisors. The hypervisors 102 and 202 respectively include LPAR management units 103 and 203, resource management units 104 and 204, migration control units 105 and 205, logical devices management units 106 and 206, and memory management units 107 and 207.

In addition, the hypervisor 102 includes a logical FC-HBA 112 and a logical FC-HBA 113 corresponding to the physical FC-HBA 111 as logical HBAs that can be assigned to an LPAR. However, because the logical FC-HBA 113 is needed as the counterpart of the logical FC-HBA 112 during live migration processing, the logical FC-HBA 113 is supposed not to be assigned to the LPAR. The hypervisor 202 includes a logical FC-HBA 212 corresponding to the physical FC-HBA 211 as a logical HBA assigned to an LPAR.

The LPAR management units 103 and 203 respectively perform processing on the LPAR 120 and an LPAR 220 such as creating or deleting the LPARs. The management unit 103 manages the logical FC-HBAs 112 and 113, a logical CPU 122, and a LPAR memory area 1010 that are allocated to the LPAR 120 as configuration information of the LPAR 120. In FIG. 1A and FIG. 1B, the LPAR 120 uses the logical FC-HBA 112 and logical CPU 122 assigned to the LPAR 120 by the LPAR management unit 103 during the time other than the time when a live migration is being performed.

The resource management units 104 and 204 respectively manage unique WWNs given to the logical FC-HBAs on a one-on-one basis. FIG. 1A and FIG. 1B show that the logical FC-HBA 112 is given a WWN 1 as a unique identifier by the resource management unit 104. The logical FC-HBA 113 is used only at the time of live migration processing, and the logical FC-HBA 113 is dynamically assigned a WWN (World Wide Name) 1' that is a counterpart of the WWN 1 as a unique identifier by the resource management unit 104. Therefore, the logical FC-HBA 113 is not assigned a unique WWN. Here the WWN 1' is a dummy WWN that is managed by the resource management unit 104, and temporarily assigned to the logical FC-HBA 113. In addition, the logical FC-HBA 212 is assigned a WWN (World Wide Name) 2 as a unique identifier by the resource management unit 204.

The migration control unit 105 controls migration processing, and issues processing commands concerning live migration to each module on the hypervisor 102, and the migration control unit 205 also controls the migration processing, and issues processing commands concerning the live migration to each module on the hypervisor and 202. In addition, the migration control units 105 and 205 communicate with each other via the network interfaces 114 and 214 and a network switch 401, and the migration control units 105 and 205 cause the server module 101 and server module 201 to transfer data concerning the live migration to and from each other.

Figure 27A:
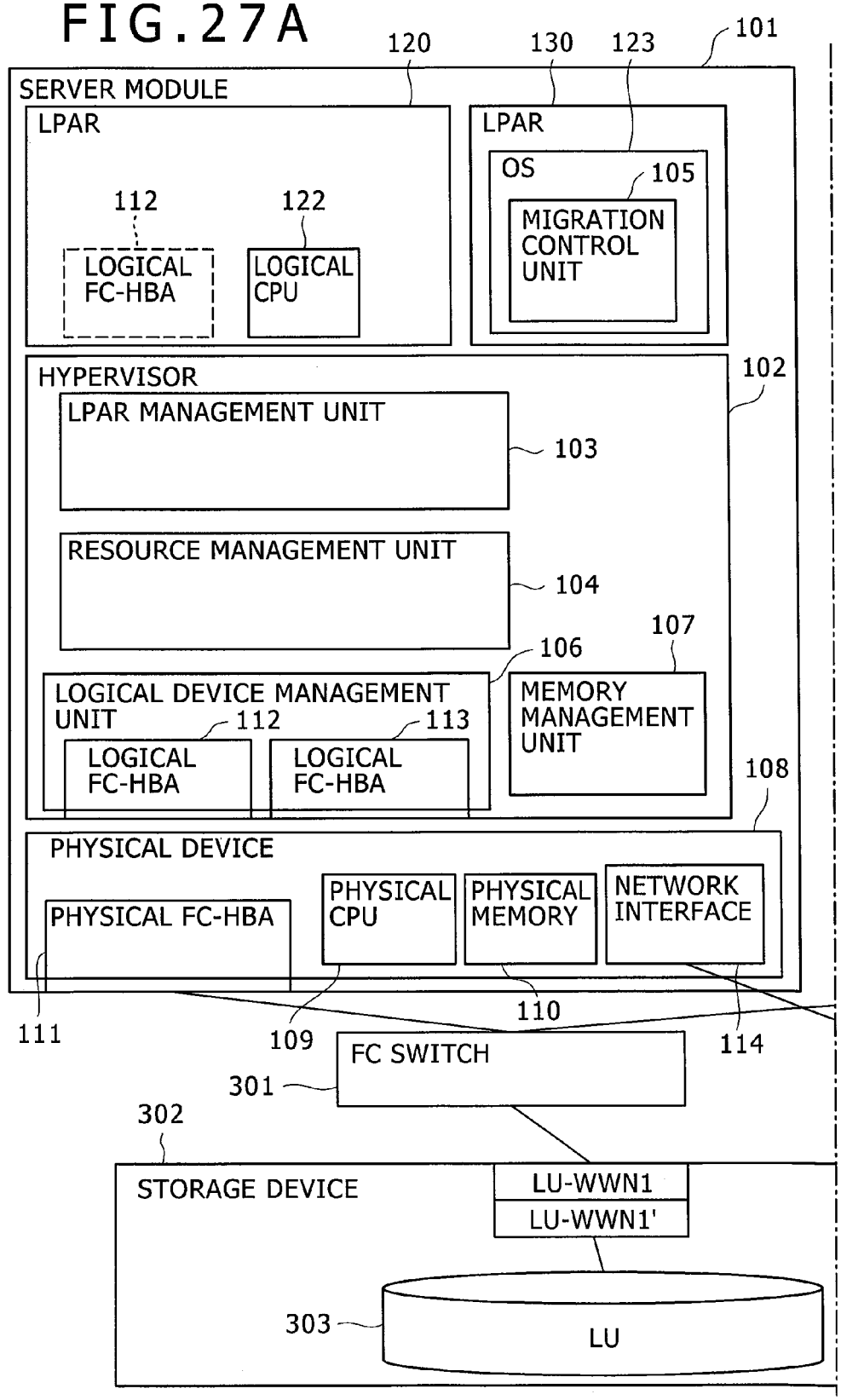

In this embodiment, although the migration control units 105 and 205 respectively include the migration control units 105 and 205, it is not indispensable for the migration control units 105 and 205 to be respectively located in the migration control units 105 and 205. For example, as shown in FIG. 27A and FIG. 27B, if the migration control units 105 and 205 can respectively control each module on the hypervisors 102 and 202, and further can communicate with other migration control units that control other server modules, it is conceivable that, after defining LPARs 130 and 230 for respectively controlling the server modules 101 and 201 in these server modules themselves, the migration control units 105 and 205 are respectively operated on the LPARs 130 and 230.

The logical device 106 control logical FC-HBAs 112 and 113 that are acquired when the physical FC-HBA 111 is divided in a logical fashion by an N_Port ID virtualization (NPIV) technique. The logical device 206 controls the logical FC-HBA 212 that is acquired when the physical FC-HBA 211 is divided in a logical fashion by the NPIV technique.

The memory management units 107 and 207 respectively manage the physical memories 110 and 210. In addition, the memory management unit 107 manages memory area allocation to the LPAR 120 and the hypervisor 102, and the memory management units 207 manages memory area allocation to the LPAR 220 and the hypervisor 202.

A storage device 302 is a so-called memory device, and is connected to the physical FC-HBA 111 and physical FC-HBA 211 via an FC switch 301. In addition, the storage device 302 includes a logically defined disk unit called an LU (Logical Unit) 303.

Connection information indicating to which server the LU 303 is connected is managed by a controller in the storage device 302. In this embodiment, the logical FC-HBA 112 having the WWN 1 or logical FC-HBA 112 having the WWN 1' is allowed to login to the LU 303. Here, it will be assumed that the WWN 1 and WWN 1' registered in the storage device 302 are respectively denoted as an LU-WWN 1 and an LU-WWN 1'. The function to set up the above connection condition is referred to as an LUN security function.

The link 1, link 1', and link 2 respectively shows a logical connection state from the logical FC-HBA 112 to the LU 303, a logical connection state from the logical FC-HBA 113 to the LU 303, a logical connection state from the logical FC-HBA 212 to the LU 303. Here, a solid line shown by the link 1 in FIG. 1A and FIG. 1B indicates that an FC login to the LU 303 has been completed, that is, the logical connection between the logical FC-HBA 112 and the LU 303 has been established. On the other hand, dashed lines shown by the link 1' and link 2 respectively indicate that FC logins to the LU 303 is not established, that is, the logical connection between the logical FC-HBA 113 and the LU 303 and the logical connection between the logical FC-HBA 212 and the LU 303 are not established. During the live processing to which this embodiment of the present invention is applied, each of the login state-via-the-link 1, login state-via-the-link 1', and login state-via-the-link 2 is changed so that an OS 123 is kept capable of accessing the LU 303.

Figure 3:
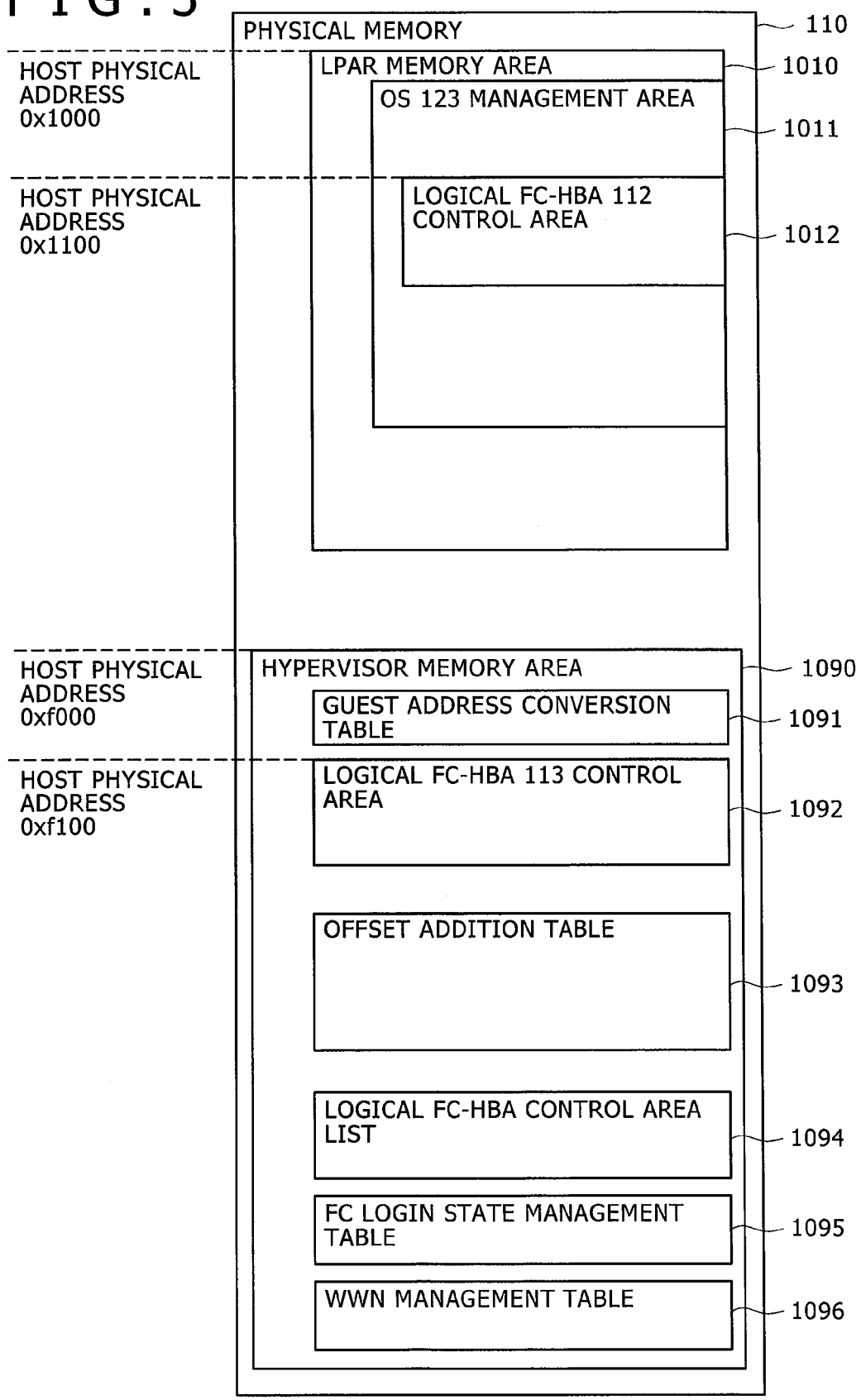
FIG. 3 is a physical memory map of a source physical memory before the migration processing.
Figure 4:
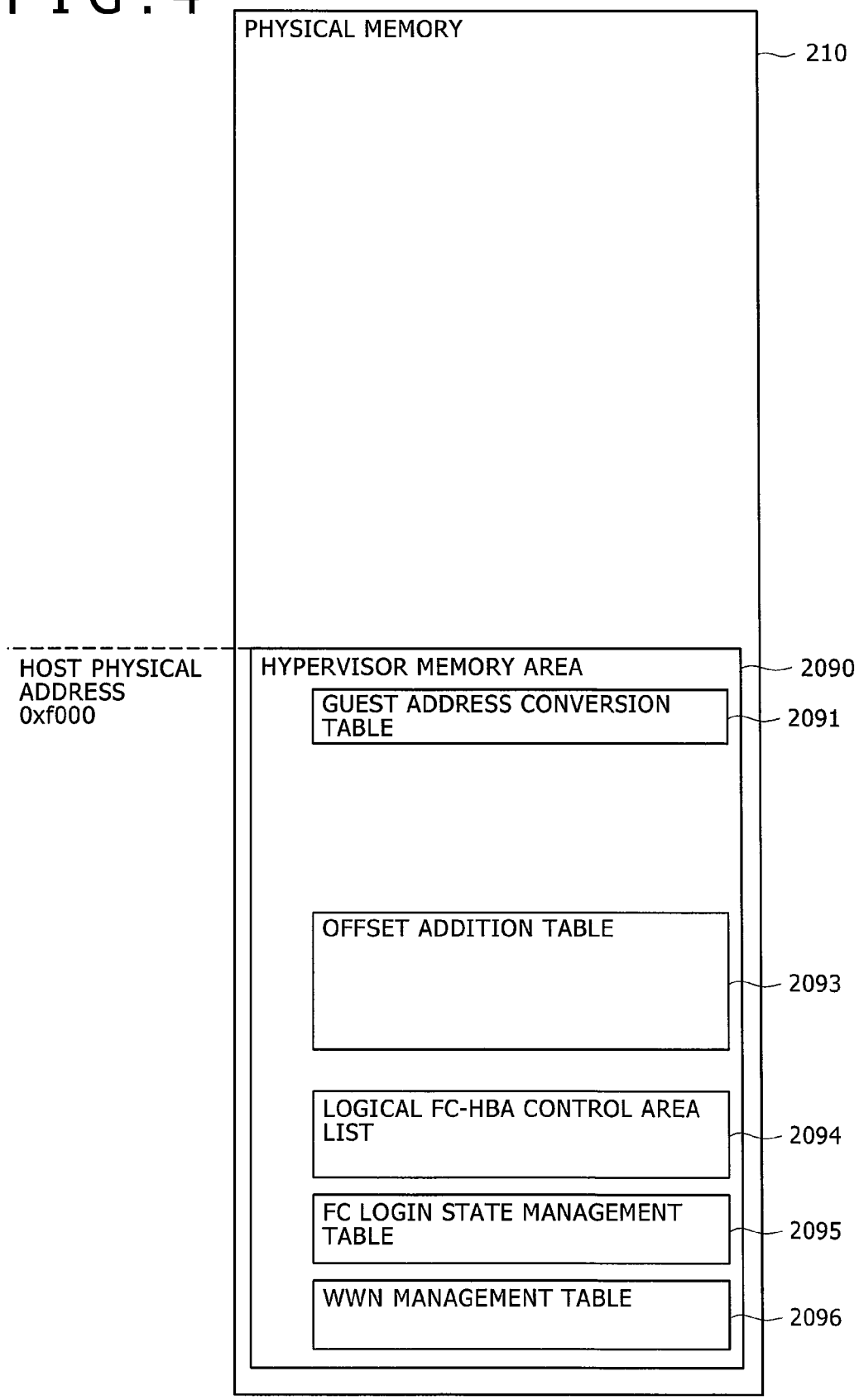
FIG. 4 is a physical memory map of a destination physical memory before the migration processing.
Figure 7B:
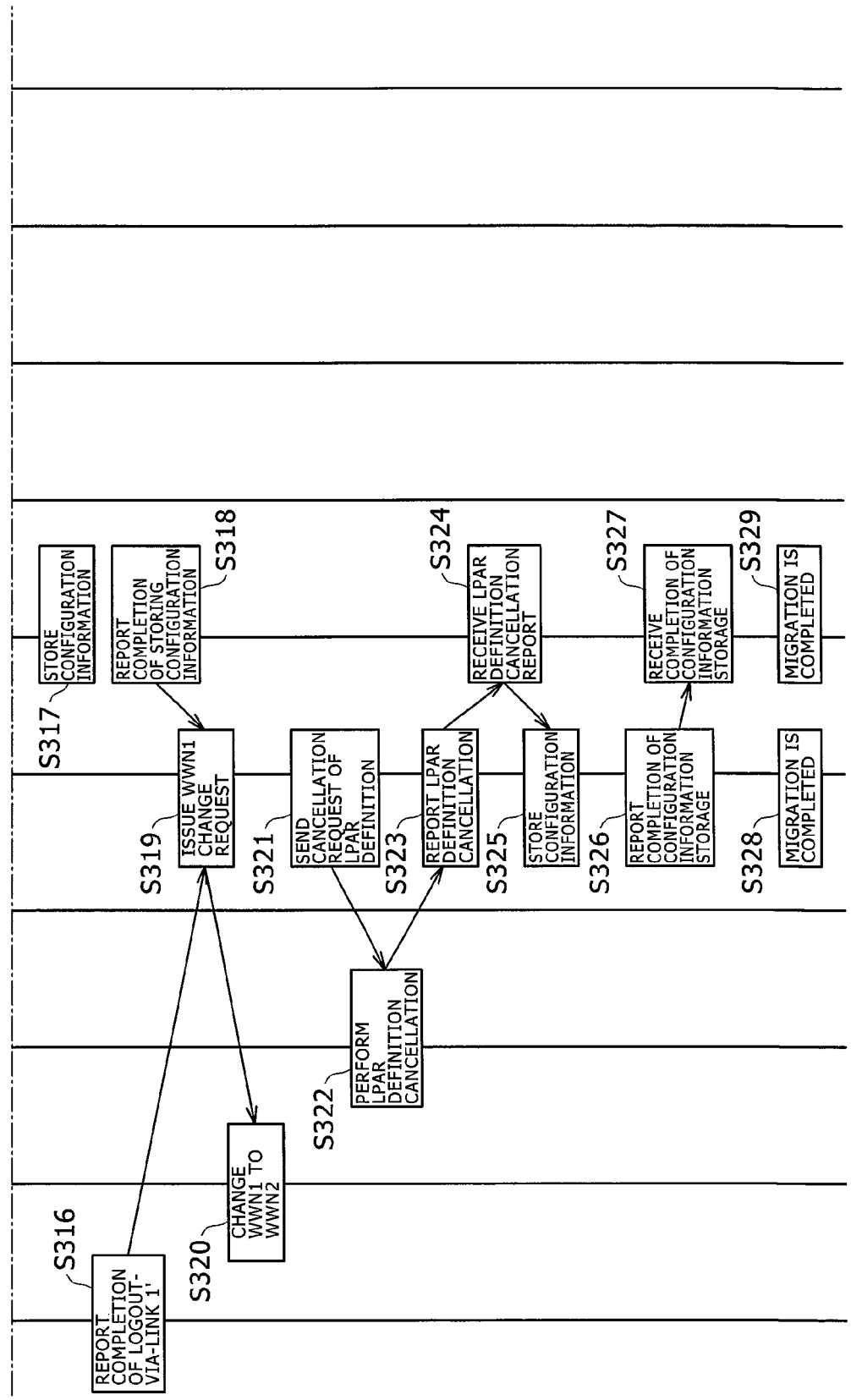

Next, a memory map of the physical memory 110 (memory map in the source server module 101) being in the state shown in FIG. 1A and FIG. 1B will be described with reference to FIG. 3. In addition, a memory map of the physical memory 210 (memory map in the destination server module 201) being in the state shown in FIG. 1A and FIG. 1B will be described with reference to FIG. 4.

The source physical memory 110 includes the LPAR memory area 1010 allocated to the LPAR 120 and a hypervisor memory area 1090 that is used for processing performed by the hypervisor 102.

The LPAR memory area 1010 includes an OS 123 management area 1011, and the OS 123 management area 1011 includes a logical FC-HBA 112 control area 1012.

The hypervisor memory area 1090 includes: a guest address conversion table 1091 including correspondences between host physical addresses indicating absolute positions in the physical memory 110 and guest logical addresses indicating relative positions in the LPAR memory area 1010; a logical FC-HBA 113 control area 1092; an offset addition table 1093 storing host physical addresses of areas including logical FC-HBA control areas; a logical FC-HBA control area list 1094 storing relative addresses of the logical FC-HBA control areas in the areas recorded in the offset addition table 1093; an FC login state management table 1095 storing the login states of the logical FC-HBAs; and a WWN management table 1096 storing WWNs assigned to the logical FC-HBAs.

The destination physical memory 210 includes a hypervisor memory area 2090. As with the source hypervisor memory area 1090, the destination hypervisor memory area 2090 includes: a guest address conversion table 2091; an offset addition table 2093; a logical FC-HBA control area list 2094; an FC login state management table 2095; and a WWN management table 2096.

With reference to FIGS. 5A and 5B, FIGS. 6A and 6B, FIGS. 7A and 7B, FIG. 8, and FIG. 9, a live migration processing in which, while the LPAR 120 on the server module 101 shown in FIG. 1A and FIG. 1B keeps operating, the operation of the LPAR 120 is taken over by the LPAR 220 on the server module 201 shown in FIG. 2A and FIG. 2B will be described hereinafter.

(S101) The source migration control unit 105 sends a migration request for starting migration processing to the destination migration control unit 205.

(S102) The destination migration control unit 205 that receives the migration request starts the migration processing.

(S103, S104) The migration control units 105 and 205 respectively send WWN acquisition requests for acquiring the WWNs respectively assigned to the logical FC-HBAs 112 and 212 to the resource management units 104 and 204.

(S105, S106) On receiving the WWN acquisition request for acquiring the WWN assigned to the logical FC-HBA 112, the resource management unit 104 sends the WWN 1 assigned to the logical FC-HBA 112 to the migration control unit 105. On receiving the WWN acquisition request for acquiring the WWN assigned to the logical FC-HBA 212, the resource management unit 204 sends the WWN 2 assigned to the logical FC-HBA 212 to the migration control unit 205.

(S107, S108) The migration control unit 105 receives the WWN 1 sent by the resource management unit 104. The migration control unit 205 receives the WWN 2 sent by the resource management unit 204.

(S109) The source migration control unit 105 sends a WWN acquisition request for acquiring the WWN assigned to the destination logical FC-HBA 212 to the destination migration control unit 205.

(S110) On receiving the WWN acquisition request for acquiring the WWN assigned to the destination logical FC-HBA 212, the destination migration control unit 205 transfers the WWN 2 to the source migration control unit 105.

(S111) The source migration control unit 105 receives the WWN 2 from the destination migration control unit 205.

(S112) The destination migration control unit 205 sends a WWN acquisition request for acquiring the WWN assigned to the source logical FC-HBA 112 to the source migration control unit 105.

(S113) On receiving the WWN acquisition request for acquiring the WWN assigned to the source logical FC-HBA 112, the source migration control unit 105 transfers the WWN 1 to the destination migration control unit 205.

(S114) The destination migration control unit 205 receives the WWN 1 from the source migration control unit 105.

(S115) The destination migration control unit 205 sends a WWN change request for changing the WWN assigned to the logical FC-HBA 212 to the WWN 1 received at step S114 to the destination resource management unit 204.

(S116) On receiving the WWN change request sent at step S115, the destination resource management unit 204 changes the WWN 2 assigned to the logical FC-HBA 212 in the WWN management table 2096 to the WWN 1.

Changes of the contents of the source WWN management table 1096 and the destination WWN management table 2096 before and after step S116 are shown in FIG. 10 and FIG. 11. In addition, after the WWN 2 assigned to the logical FC-HBA 212 is changed to the WWN 1, the WWN 2 is temporarily held by the source migration control unit 205.

(S117) The source migration control unit 105 sends a configuration information acquisition request for acquiring configuration information concerning the LPAR 120 to the source LPAR management unit 103.

(S118) On receiving the configuration information acquisition request for acquiring the configuration information concerning the LPAR 120, the source LPAR management unit 103 sends the configuration information concerning the LPAR 120 to the source migration control unit 105.

(S119) On receiving the configuration information concerning the LPAR 120, the source migration control unit 105 transfers the configuration information to the destination migration control unit 205.

(S120) On receiving the configuration information concerning the LPAR 120, the destination migration control unit 205 sends the configuration information concerning the LPAR 120 to the destination LPAR management unit 203 and requests the destination LPAR management unit 203 to reflect the configuration information for this migration processing.

(S121) The destination LPAR management unit 203 receives the configuration information concerning the LPAR 120, and assigns logical resources, which are similar to those assigned to the LPAR 120, such as the logical FC-HBA 212 corresponding to the logical FC-HBA 112, the logical CPU 222 corresponding to the logical CPU 122, and a memory area having the same capacity as the memory area allocated to the LPAR 120, to the LPAR 220 on the basis of the received configuration information.

(S122) The source migration control unit 105 sends a temporary activate request for temporarily activating the LPAR 220 to the destination migration control unit 205.

(S123) On receiving the temporary activate request for temporarily activating the LPAR 220, the destination migration control unit 205 temporarily activates the destination LPAR 220.

(S201) The source migration control unit 105 sends an FC path change request to the source logical device management unit 106, in which the FC path change request is a request for changing the link 1 that connects the logical FC-HBA 112 to the LU 303 via the physical FC-HBA 111 to the link 1' that connects the logical FC-HBA 113 to the LU 303 via the physical FC-HBA 111.

(S202) On receiving the FC path change request at step S201, the source logical device management unit 106 performs initialization processing on the logical FC-HBA 113. Owing to the assignment of the WWN 1' to the logical FC-HBA 113 performed by the source resource management unit 104 at step S202, it becomes possible for the source server module to perform login processing to the LU 303 via the link 1'. Details of contents of step S202 will be explained later at steps S401 to 407.

(S203) The source logical device management unit 106 performs login-via-the-link 1' processing. This login processing is performed through some commands concerning the login processing being sent from the source logical device management unit 106 to a logical FC-HBA firmware 11301 via the logical FC-HBA 112 control area 1012 or vice versa. Details of contents of step S203 will be explained later at steps S501 to 511 and steps S801 to 804.

(S204) The source logical device management unit 106 sends a completion report of the login-via-the-link 1' to the destination migration control unit 105.

(S205) On receiving the completion report of the login-via-the-link 1', the source migration control unit 105 sends a rewrite request for rewriting the guest address conversion table 1091 to the source memory management unit 107.

(S206) On receiving the rewrite request for rewriting the guest address conversion table 1091, the source memory management unit 107 rewrites the guest address conversion table 1091. With reference to an entry in which a conversion address of the logical FC-HBA 112 control area 1012 in the guest address conversion table 1091, the source memory management unit 107 rewrites a host physical address (0x1100) of the logical FC-HBA 112 control area 1012 stored in the entry into a host physical address (0xff00) of the logical FC-HBA 113 control area 1092, and sends a completion report of the rewrite to the source migration control unit 105.

Changes of the contents of the guest address conversion table 1091 before and after this rewrite processing, that is, before and after the FC path switching are shown in FIG. 12 and FIG. 13. Owing to these changes, the reference 1101 to the logical FC-HBA 112 control area 1012 (shown in FIG. 14) is changed to the reference 1102 to the logical FC-HBA 113 control area 1092 (shown in FIG. 15).

Figure 14:
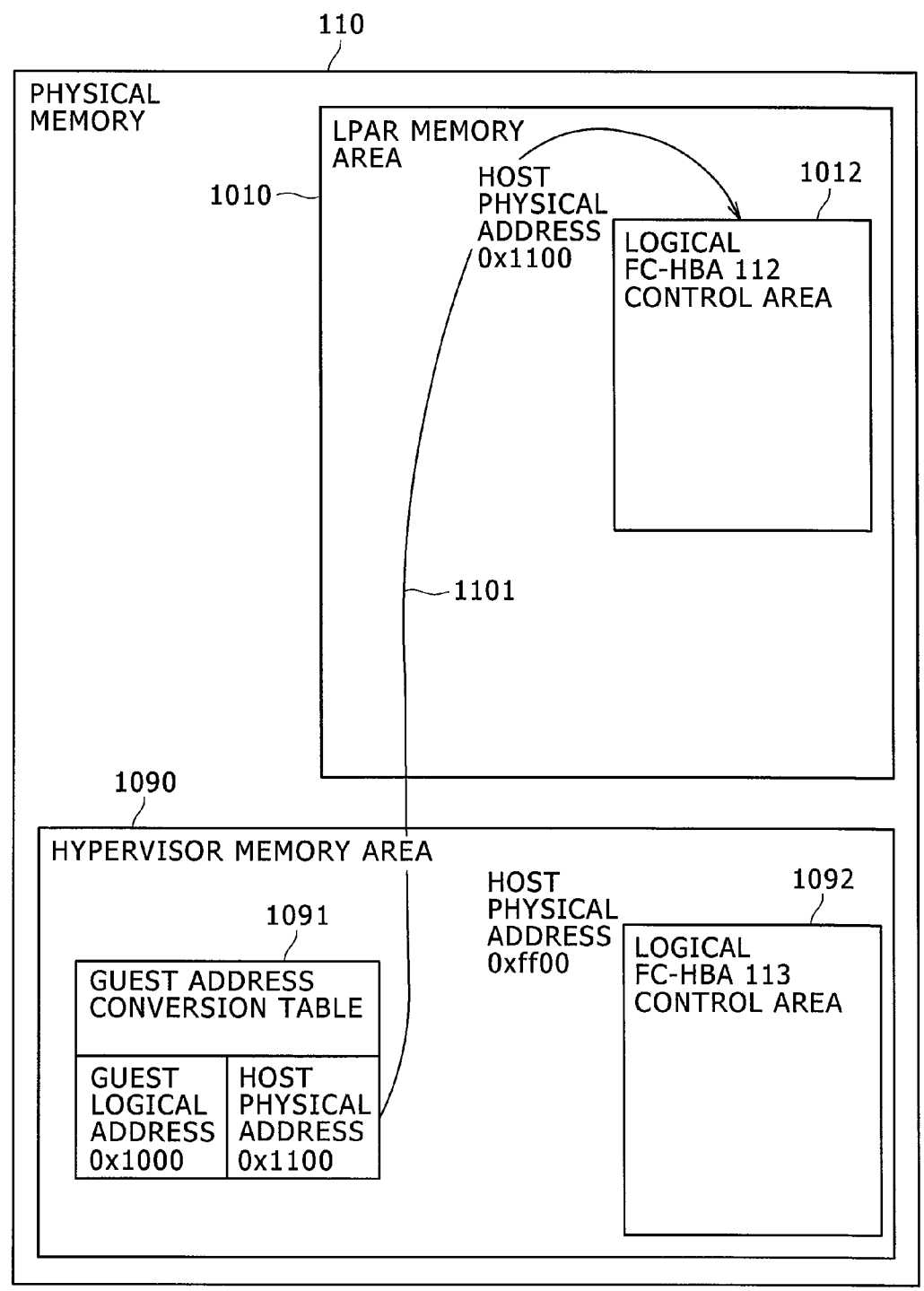
FIG. 14 is a physical memory map before initialization of a logical FC-HBA 113 and before switching the path.
Figure 15:
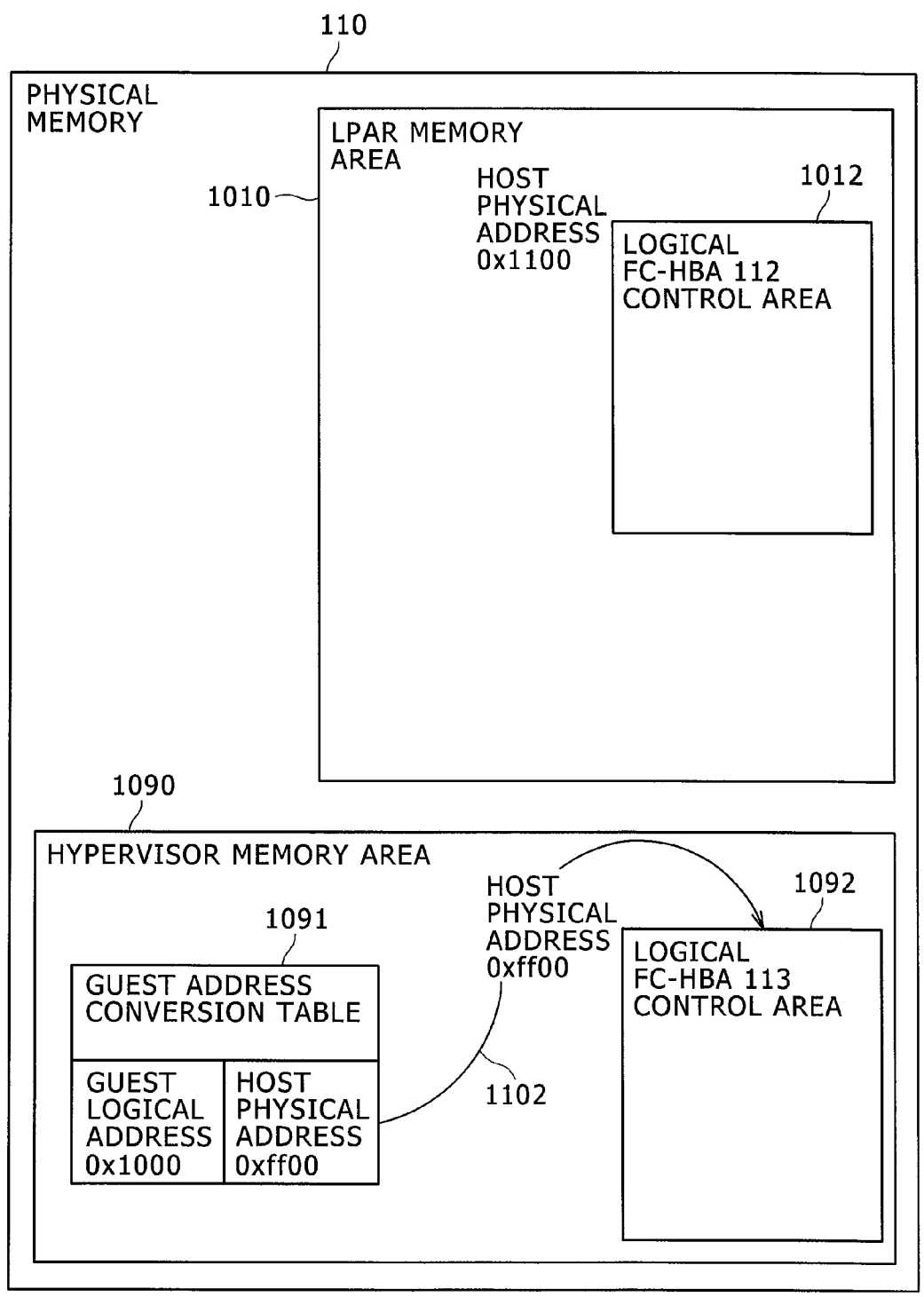
FIG. 15 is the physical memory map after the initialization of the logical FC-HBA 113 and after switching the path.

Here, FIG. 14 is a diagram schematically showing the reference from the guest address conversion table 1091 to the FC-HBA control area before initialization of the logical FC-HBA 113 and before switching the path. In addition, FIG. 15 is a diagram schematically showing the reference from the guest address conversion table 1091 to the FC-HBA control area after initialization of a logical FC-HBA 113 and after switching the path.

Disk access processing from the OS 123 to the LU 303 before step 206 is performed through some disk access commands being sent from an FC-HBA Driver 12301 to a logical FC-HBA firmware 11201 via the logical FC-HBA 112 control area 1012 or vice versa in accordance with the processes at steps S601 to S603 and at steps S801 to S804. These processes at steps S601 to S603 and at steps S801 to S804 will be described later. The logical FC-HBA firmware 11201 executes login, logout, read/write processing, and the like with the LU as a target in accordance with disk access commands written in the logical FC-HBA 112 control area 1012.

Owing to the process performed at step S206, the disk access processing performed on the LU 303 by the OS 123 can be achieved through disk access commands being sent from the FC-HBA Driver 12301 to the logical FC-HBA firmware 11301 via the logical FC-HBA 113 control area 1092 or vice versa in accordance with processes performed at steps S701 to S703 and steps S901 to S904. The processes performed at steps S701 to S703 and steps S901 to S904 will be explained later.

In other words, the path through which the OS 123 accesses the LU 303 is changed from the link 1 via the logical FC-HBA 112 to the link 1' via the logical FC-HBA 113.

On the other hand, because the guest address conversion table 1091 is included in the hypervisor memory area 1090 allocated to the physical memory 110, the guest address conversion table 1091 is included in the memory area that the OS 123 cannot recognize nor operate. Therefore, the FC path switching performed at step S206 is hidden from the OS 123 operating on the source LPAR 120. AS a result, commands issued to the logical CPU 122 by the OS 123 and the FC-HBA Driver 12301 for accessing the LU 303 can be continuously used before and after step S206 regardless of the FC path (link) change.

(S207) On receiving the completion report of the rewrite, the source migration control unit 105 sends a logout request for requesting a logout-via-the-link 1 to the source logical device management unit 106.

(S208) On receiving the logout request for requesting the logout-via-the-link 1, the source logical device management unit 106 performs the logout-via-the-link 1. The logout-via-the-link 1 processing is performed through some commands concerning the logout processing being sent from the source logical device management unit 106 to the logical FC-HBA firmware 11201 via a control communication area 10122 of the logical FC-HBA 112 or vice versa.

Figure 16:
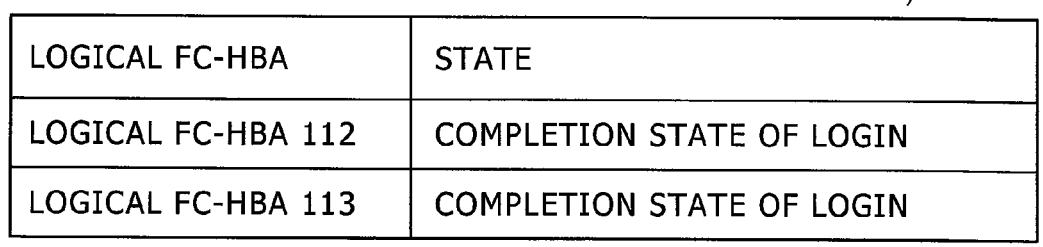
FIG. 16 is an FC login status management table after completion of a login-via-the-link 1' and after completion of a login-via-the-link 1.
Figure 17:
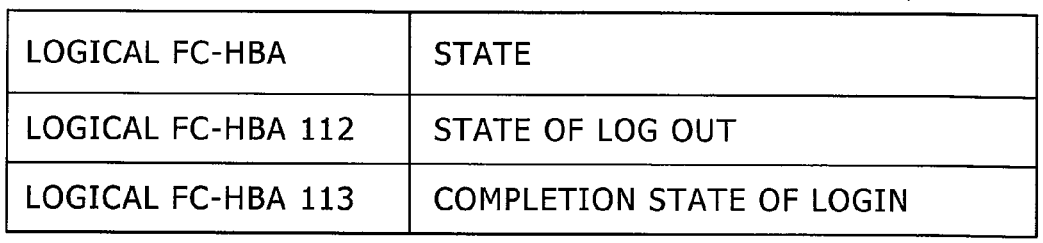
FIG. 17 is the FC logout status management table after completion of a logout-via-the link 1.

Contents of the FC login state management table 1095 changes from contents showing the state before the processing at step 208, that is, the completion state of the login-via-the-link shown in FIG. 16 to contents showing the state after the processing at step 208, that is, the completion state of the logout-via-the-link 1 shown in FIG. 17. Because the source logical FC-HBA 112 has finished the logout-via-the-link 1, it becomes possible that the destination logical FC-HBA 212 uses the WWN 1 used by the source logical FC-HBA 112. As a result, it becomes possible that the destination logical FC-HBA 212 logins via the link 2 with the use of the WWN 1.

(S209) The source logical device management unit 106 sends a completion report of the logout to the source migration control unit 105.

(S210) On receiving the completion report of the logout, the source migration control unit 105 transfers login information to the destination migration control unit 205, and then issues a destination login request to the destination migration control unit 205.

(S211) The destination migration control unit 205 sends a login-via-the-link 2 request to the destination logical device control unit 206.

(S212) The destination logical device control unit 206 performs the login-via-the-link 2 processing with the use of the WWN 1 assigned to the logical FC-HBA 212 at step S116.

Figure 18:
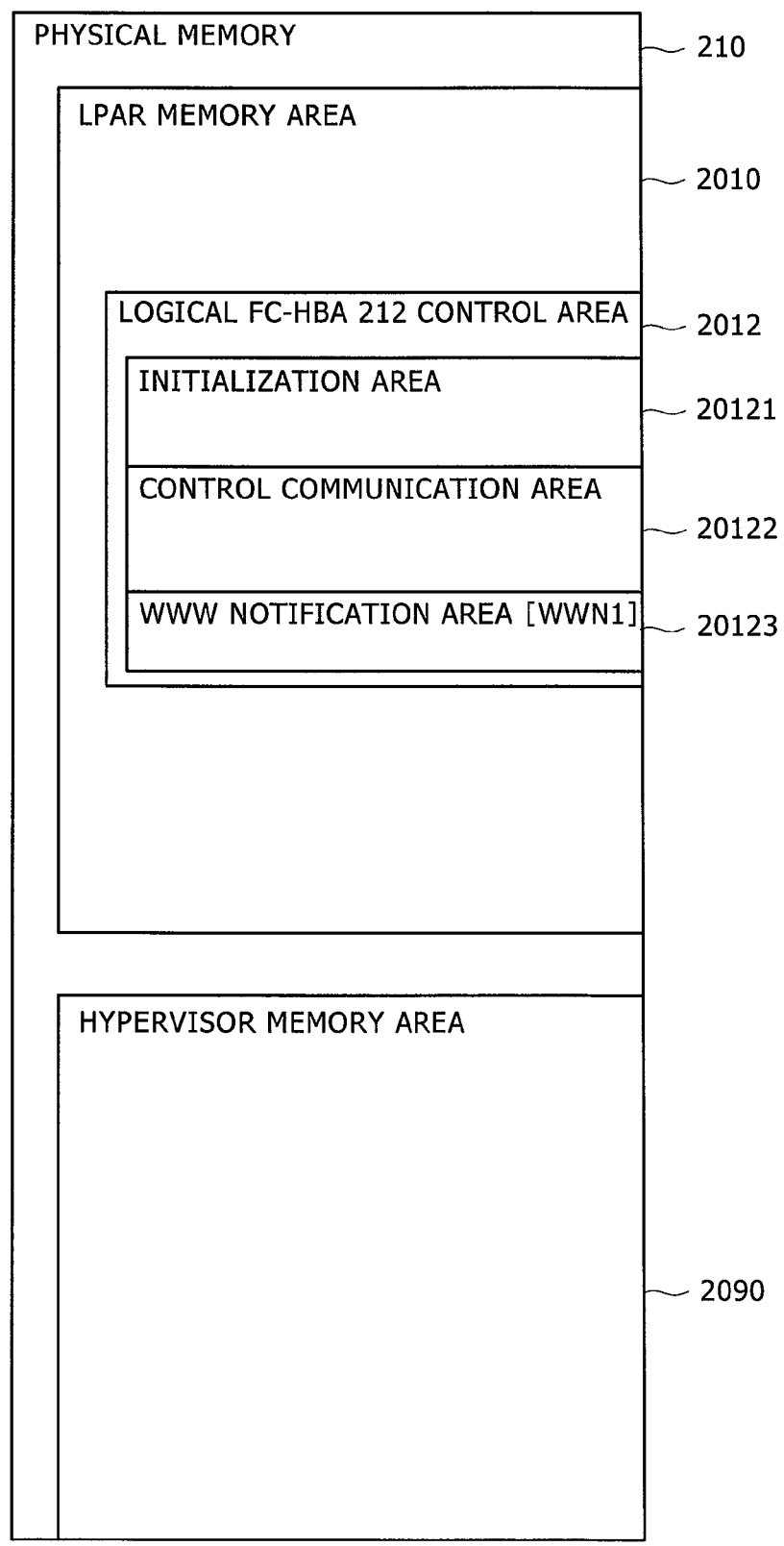
FIG. 18 is the physical memory map of the destination physical memory during login-via-the-link 2 processing.

The login-via-the-link 2 processing is performed through some commands concerning the login processing being sent from the destination logical device management unit 206 to a logical FC-HBA firmware 21201 via a control communication area 20122 in a logical FC-HBA 212 control area 2012 shown in FIG. 18 and vice versa. Here, FIG. 18 shows the memory map of the destination physical memory 210 during the login-via-the-link 2 processing. A guest logical address of the logical FC-HBA 212 control area 2012 used in this processing is the same as a guest logical address of the source logical FC-HBA 112 control area 1012.

(S213) The destination logical device management unit 206 sends a completion report of the login-via-the-link 2 to the destination migration control unit 205.

(S214) On receiving the completion report of the login-via-the-link 2, the destination migration control unit 205 notifies the source migration control unit 105 that the FC login to the destination server module 201 has been completed.

(S215) The source migration control unit 105 receives the completion report of the login to the destination server module 201 from the destination migration control unit 205.

(S301) The source migration control unit 105 issues an acquisition request for acquiring device/memory information of the LPAR 120 to the source LPAR management unit 103. The device information includes types and internal states of the logical devices managed in the hypervisor 102, and the memory information includes information concerning the LPAR memory area 1010 allocated to the LPAR 120.

(S302) On receiving the acquisition request for acquiring the device/memory information, the source LPAR management unit 103 sends the device/memory information concerning the LPAR 120 to the source migration control unit 105.

(S303) The source migration control unit 105 receives the device/memory information concerning the LPAR 120 sent at step S302, and transfers the received device/memory information to the destination migration control unit 205.

(S304) On receiving the device/memory information concerning the LPAR 120 transferred at step S303, the destination migration control unit 205 sends the received device/memory information concerning the LPAR 120 and a device/memory information reflection request to the destination LPAR management unit 203.

(S305) On receiving the device/memory information concerning the LPAR 120 and the device/memory reflection request both of which are sent at S304, the destination LPAR management unit 203 reflects the device/memory information concerning the LPAR 120 in the LPAR 220. Through the above processing, the contents written in the guest address of the LPAR memory area 1010 of the LPAR 120 and the contents written in the counterpart guest address of an LPAR memory area 2010 of the LPAR 120 become the same.

The processes performed at steps S301 to S305 are repeated until a time necessary for the source logical CPU to transfer the rewritten memory information to the destination server module 201 becomes less than a reference value during the transfer of the device/memory information. The reference value for the time necessary for the memory information to be transferred at this process is the maximum logical CPU stop time during which the OS 123 can continue to normally operate when the logical CPU is suspended and then started again.

(S306) After the above repeated processes at steps S301 to S305 are finished, the source migration control unit 105 stops the logical CPU 122 assigned to the LPAR 120.

(S307) The source migration control unit 105 issues an acquisition request for acquiring difference device/memory information indicating changes of the devices and memory during a time period from the time when the source LPAR management 103 acquires the memory information at step S302 to the time when the logical CPU is stopped at step S306 to the source LPAR management 103.

(S308) On receiving the acquisition request for acquiring the difference device/memory information, the source LPAR management 103 passes the difference device/memory information to the source migration control unit 105.

(S309) On acquiring the difference device/memory information, the source migration control unit 105 transfers the acquired difference device/memory information to the destination migration control unit 205.

(S310) The destination migration control unit 205 requests the destination LPAR management unit 203 to reflect the acquired difference device/memory information for this migration processing.

(S311) The destination LPAR management unit 203 reflects the acquired difference device/memory information in the LPAR 220, and then sends a completion report of the reflection of the difference device/memory information to the destination migration control unit 205. At this moment, the LPAR 220 has the same number of the same types of logical devices as those assigned to the LPAR 120. In addition, data in the memory area allocated to the LPAR 120 is replicated in the memory area allocated to the LPAR 220, the state of the OS 123 that is operating on the LPAR 120 is taken over on the LPAR 220, and it becomes possible for the OS 123 to continuously operate on the LPAR 220.

(S312) On receiving the completion report of the reflection of the difference device/memory information, the destination migration control unit 205 makes a logical CPU 222 assigned to the LPAR 120 to operate.

(S313) The destination migration control unit 205 sends an operation start report of the destination LPAR to the source migration control unit 105.

(S314) On receiving the operation start report of the destination LPAR, the source migration control unit 105 sends a logout request for requesting a logout-via-the-link 1' to the source logical device management unit 106.

(S315] On receiving the logout request for requesting a logout-via-the-link 1', the source logical device management unit 106 performs the logout processing. The logout-via-the-link 1' processing is performed through some commands concerning the logout processing being sent from the source logical device management unit 106 to the logical FC-HBA firmware 11301 via a control communication area 10922 of the logical FC-HBA 113 or vice versa in a similar fashion to step S203.

(S316) The source logical device management unit 106 sends a completion report of the logout-via-the-link 1' to the source migration control unit 105.

(S317) The destination migration control unit 205 stores configuration information concerning the destination LPAR 220.

(S318) The destination migration control unit 205 sends a completion report of storing the configuration information of the LPAR 220 to the source migration control unit 105.

(S319) Receiving the completion report of the configuration information from the destination migration control unit 205 and the completion report of the logout from the source logical device management unit 106, the source migration control unit 105 issues a source WWN change request to the source resource management unit 104.

(S320) On receiving the source WWN change request issued at step S319, the source resource management unit 104 changes the WWN 1 assigned to the logical FC-HBA 112 to the WWN 2.

Changes of the contents of the source WWN management table 1096 and the destination WWN management table 2096 before and after step S320 are shown in FIG. 11 and FIG. 19.

(S321) The source migration control unit 105 sends a cancellation request of the source LPAR definition to the source LPAR management unit 103.

(S322) On receiving the cancellation request of the source LPAR definition, the source LPAR management unit 103 releases assignments of all the logical devices made to the LPAR 120, and then sends a completion report of the cancellation of the source LPAR definition to the source migration control unit 105.

(S323) On receiving the completion report of the cancellation of the source LPAR definition from the source LPAR management unit 103, the source migration control unit 105 notifies the destination migration control unit 205 of the completion report of the cancellation of the source LPAR definition.

(S324) The destination migration control unit 205 receives the completion report of the cancellation of the source LPAR 120 definition.

(S325) The source migration control unit 105 stores configuration information of the source LPAR 120 after step S321.

(S326) The source migration control unit 105 notifies the destination migration control unit 205 that the storage of the configuration information is completed.

(S327) The destination migration control unit 205 receives the message that the storage of the configuration information is completed.

(S328 and S329) The migration control units 105 and 205 respectively finish their roles in the migration processing.

After steps S328 and S329, the OS 123 that has been operating on the LPAR 120 as shown in FIG. 1A and FIG. 1B, that is, as shown in the overall block diagram before the migration processing, comes to operate on the LPAR 220 as shown in FIG. 2A and FIG. 2B, that is, as shown in the overall block diagram after the migration processing.

Figure 8:
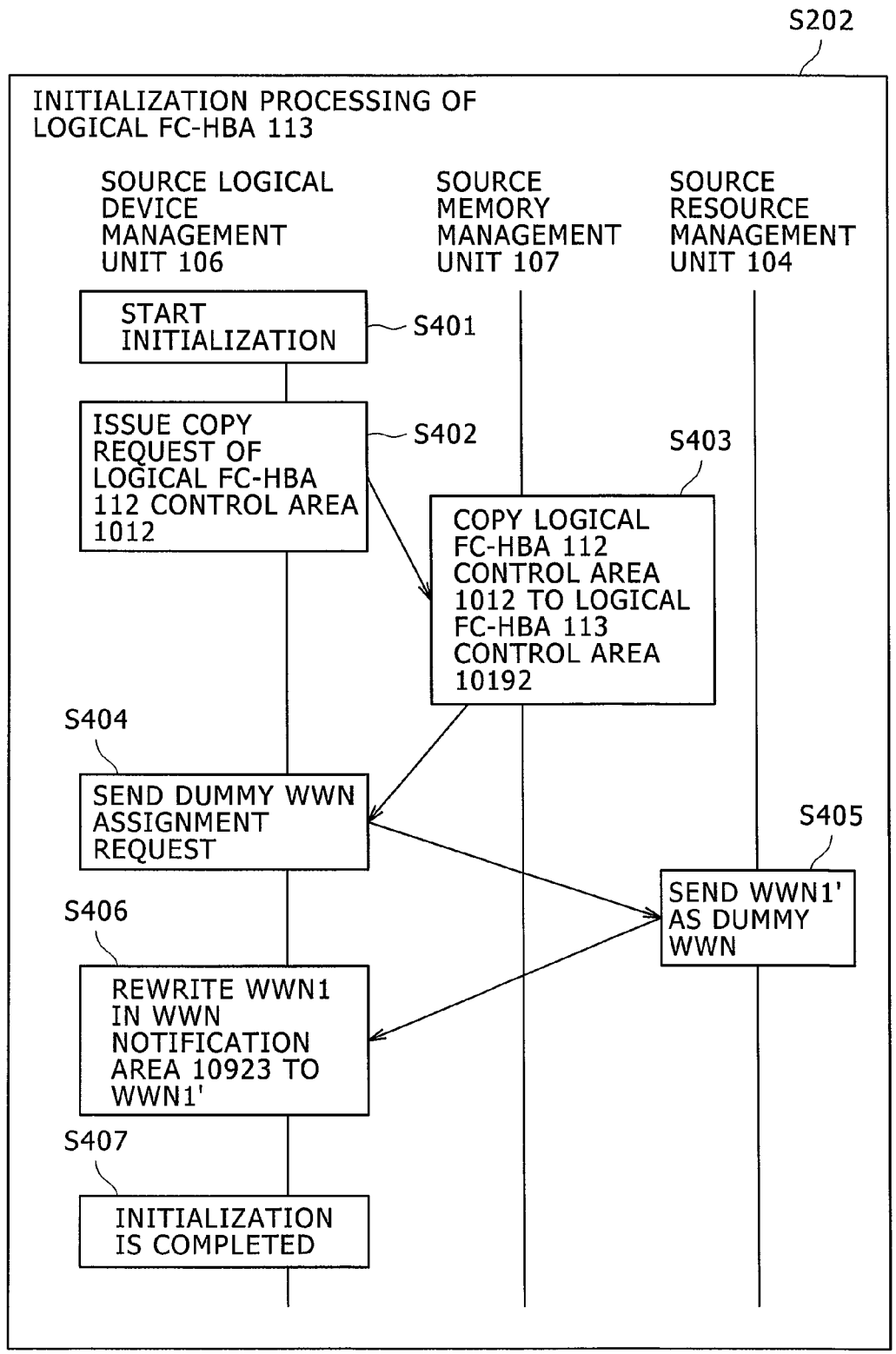
FIG. 8 is a sequence diagram of initialization processing of a logical FC-HBA 113.
Figure 20:
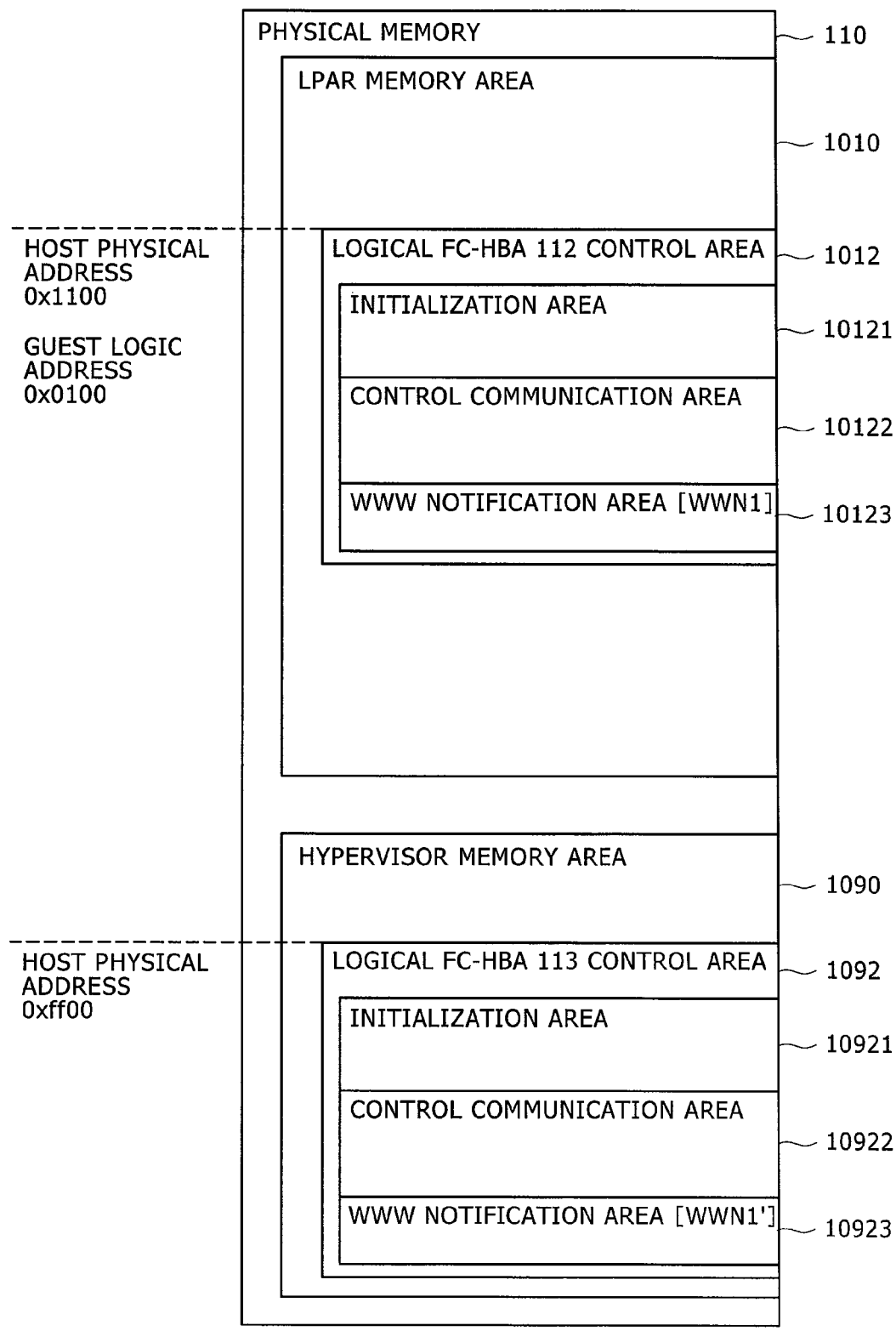
FIG. 20 is the memory map of the source physical memory during initialization of the logical FC-HBA 113.

Hereinafter, details of the initialization processing performed on the logical FC-HBA 113 at step S202 will be described with reference to FIG. 8 and FIG. 20.

(S401) The source logical device management unit 106 starts to perform the initialization on the logical FC-HBA 113.

(S402) The source logical device management unit 106 issues a copy request for copying the logical FC-HBA 112 control area 1012 to the source memory management unit 107.

(S403) On receiving the copy request at step S402, the source memory management unit 107 copies the logical FC-HBA 112 control area 1012 on the LPAR memory area 1010 to the logical FC-HBA 113 control area 1092 on the hyper visor memory area 1090.

(S404) The source logical device management unit 106 sends a dummy WWN assignment request to the source resource management unit 104.

(S405) On receiving the dummy WWN assignment request, the source resource management unit 104 sends the WWN 1' as the dummy WWN to the source logical device management unit 106. The WWN 1' that is the counterpart of the WWN 1 is uniquely determined on the basis of the WWN 1. In addition, the WWN 1' has been registered in advance as an identifier capable of logining to the LU 303 along with the WWN 1 in the storage device 302.

At step S202, the source resource management unit 104 assigns the WWN 1' that is the dummy WWN to the logical FC-HBA 113 of the source server module. At step S212, the WWN 1 is assigned to the logical FC-HBA 212 of the destination server module. Owing to the above processes, both source server module and destination server module come to be in the completion state of the login to the LU 303. In addition, immediately after the OS 123 starts to operate on the destination LPAR 220, it becomes possible for the OS 123 to continuously access the LU 303.

(S406) On receiving the WWN 1' from the source resource management unit 104, the source logical device management unit 106 rewrites the WWN 1 in a WWN notification area 10923 into the WWN 1'.

(S407) The source logical device management unit 106 completes the initialization of the logical FC-HBA 113 control area 1092.

Figure 9:
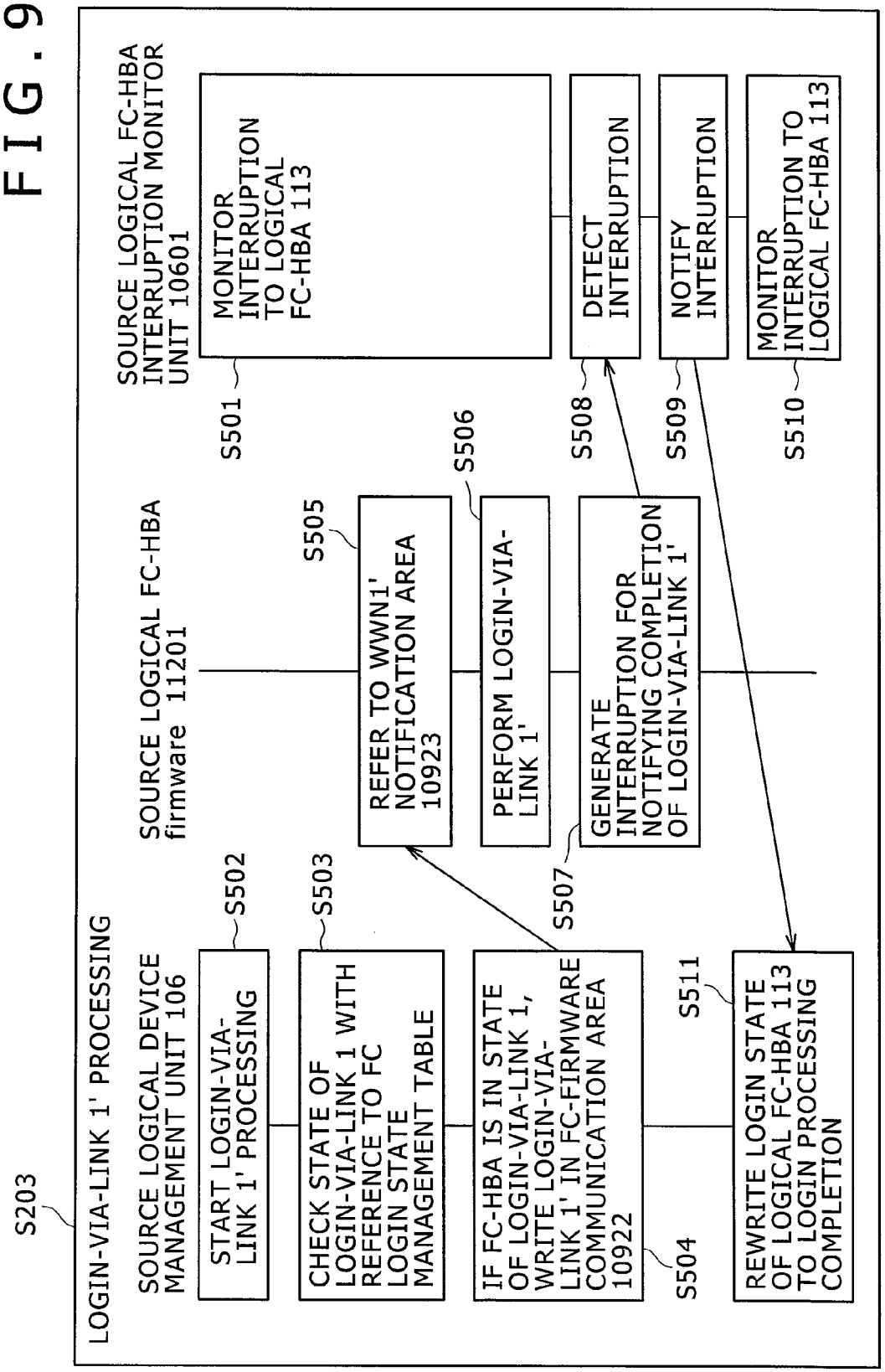
FIG. 9 is a sequence diagram of the login-via-the-link 1' processing.

Next, details of the login-via-the-link 1' processing at step S203 will be described with reference to FIG. 9.

(S501) A source logical FC-HBA interruption monitor unit 10601 monitors a logical interruption to the logical FC-HBA 113.

(S502) The source logical device management unit 106 starts to perform login-via-the-link 1' processing.

(S503) The source logical device management unit 106 judges whether the logical FC-HBA 113 is in a login state or not with reference to the FC login state management table 1095.

(S504) As a result of the judgment at step S503, if the logical FC-HBA 113 is in the completion state of the login, the source logical device management unit 106 sets a login command in the control communication area 10922 of the logical FC-HBA 113, and notifies the FC-HBA firmware 11201 of a login request. On the other hand, as a result of the judgment at step S503, if the logical FC-HBA 113 is in the state of the logout, the source logical device management unit 106 gets away from the login-via-the-link 1' processing.

(S505) The source FC-HBA firmware 11201 acquires a login command with reference to the control communication area 10922.

(S506) On acquiring the login command, the source FC-HBA firmware 11201 performs the login.

(S507) After the login is completed, the FC-HBA firmware 11201 generates an interruption for notifying that the login is completed.

(S508) The source logical FC-HBA interruption monitor unit 10601 detects the interruption for notifying the login completion generated by the FC-HBA firmware 11201.

(S509) On detecting the interruption, the source logical FC-HBA interruption monitor unit 10601 notifies the logical device management unit 106 of the login completion.

(S510) The source logical FC-HBA interruption monitor unit 10601 comes to be in the state of waiting for an interruption.

(S511) On receiving the notification of the login completion from the interruption monitor unit 10601, the source logical device management unit 106 rewrites the login state of the logical FC-HBA 113 stored in the FC login state management table 1095 into the login processing completion.

Before the process at step S203, that is, before the login-via-the-link 1', the FC login state management table 1095 is in a state shown in FIG. 21. After the process at step S203, that is, after the login-via-the-link 1', the FC login state management table 1095 is in the state shown in FIG. 16.

Figure 25:
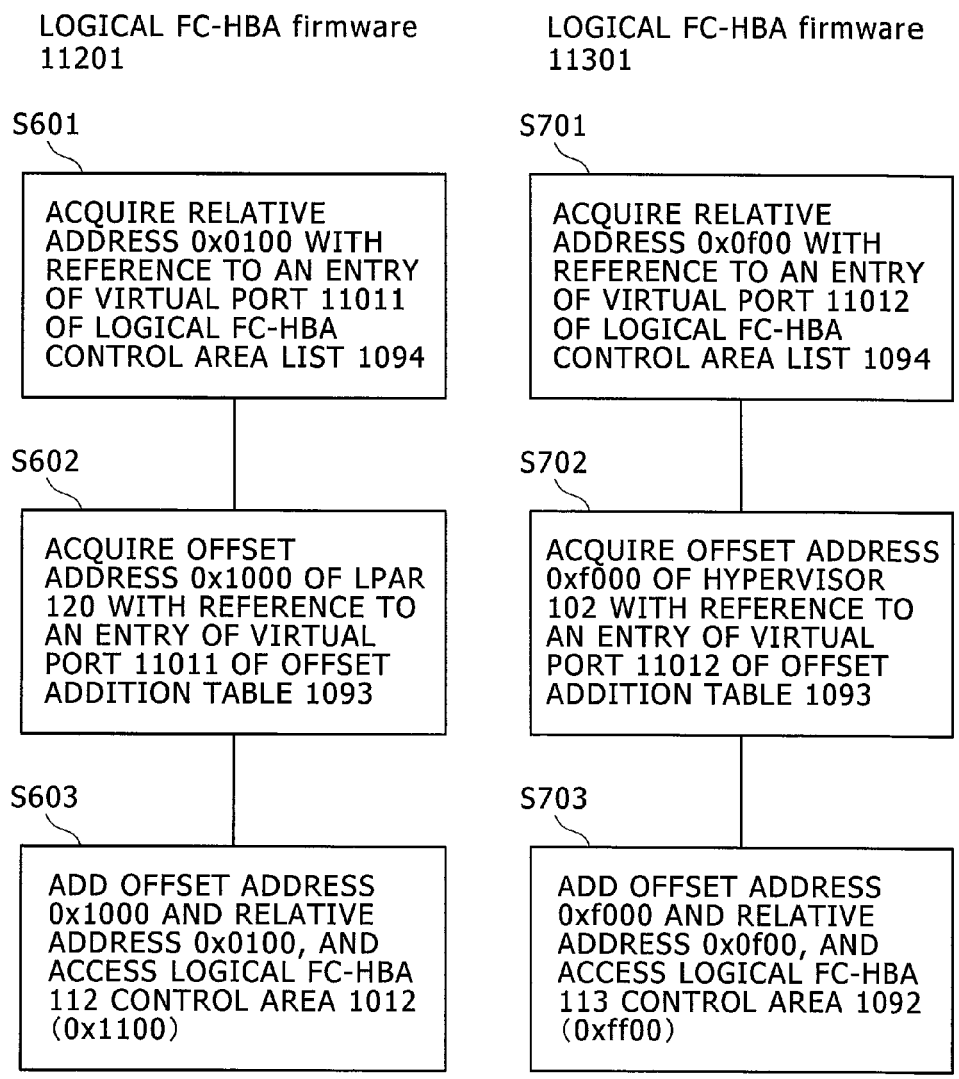
FIG. 25 shows two flowcharts in which two different pieces of logical FC-HBA firmware respectively access two different logical FC-HBA control areas.

The way the logical FC-HBA firmware 11201 accesses the logical FC-HBA 112 control area 1012 will be described with reference to FIG. 25.

The logical FC-HBA firmware 11201 accesses the logical FC-HBA 112 control area 1012, and operates on the basis of commands written in the control communication area 10122. Details of the way the logical FC-HBA firmware 11201 accesses the logical FC-HBA 112 control area 1012 are as follows.

(S601) With reference to an entry of a virtual port 11011 of the logical FC-HBA control area list 1094, the logical FC-HBA firmware 11201 acquires a relative address 0x0100 of the logical FC-HBA 112 control area 1012 corresponding to the virtual port 11011.

The logical FC-HBA control area list 1094 at this time is shown in FIG. 22.

(S602) The logical FC-HBA firmware 11201 acquires an offset address 0x1000 of the LPAR 120 to which the virtual port 11011 is assigned with reference to the offset addition table 1093. The offset addition table 1093 at this time is shown in FIG. 23.

(S603) The logical FC-HBA firmware 11201 calculates the host physical address 0x1100 at which the logical FC-HBA 112 control area 1012 is disposed by adding the acquired relative address 0x0100 and the host physical address 0x1000 of the LPAR 120, and accesses the calculated address 0x1100.

The way the logical FC-HBA firmware 11301 accesses the logical FC-HBA 113 control area 1092 will be described with reference to FIG. 25.

The logical FC-HBA firmware 11301 accesses the logical FC-HBA 113 control area 10922, and operates on the basis of commands written in the control communication area 10922. Details of the way the logical FC-HBA firmware 11301 accesses the logical FC-HBA 113 control area 1092 are as follows.

(S701) With reference to an entry of a virtual port 11012 of the logical FC-HBA control area list 1094, the logical FC-HBA firmware 11301 acquires a relative address 0x0f00 of the logical FC-HBA 113 control area 1092 corresponding to the virtual port 11012.

(S702) The logical FC-HBA firmware 11301 acquires an offset address 0xf000 of the hypervisor to which the virtual port 11012 is assigned with reference to the offset addition table 1093.

(S703) The logical FC-HBA firmware 11301 calculates the host physical address 0xff00 at which the logical FC-HBA 113 control area 1092 is disposed by adding the acquired relative address 0x0f00 and the host physical address 0xf000 of the hypervisor, and accesses the address 0xff00.

Figure 24A:
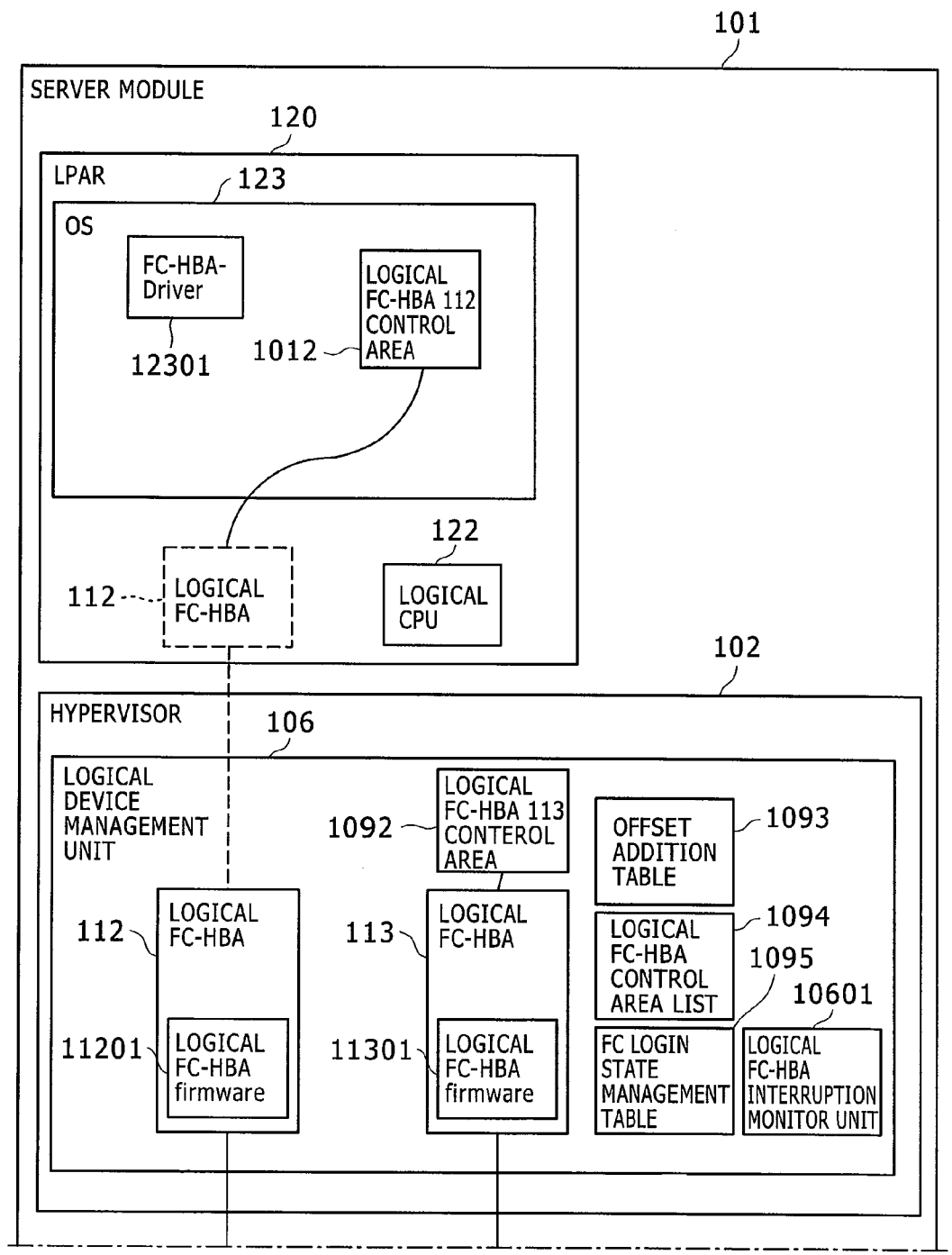
FIG. 24A and FIG. 24B are a block diagram showing an FC path of a source logical FC-HBA.
Figure 24B:
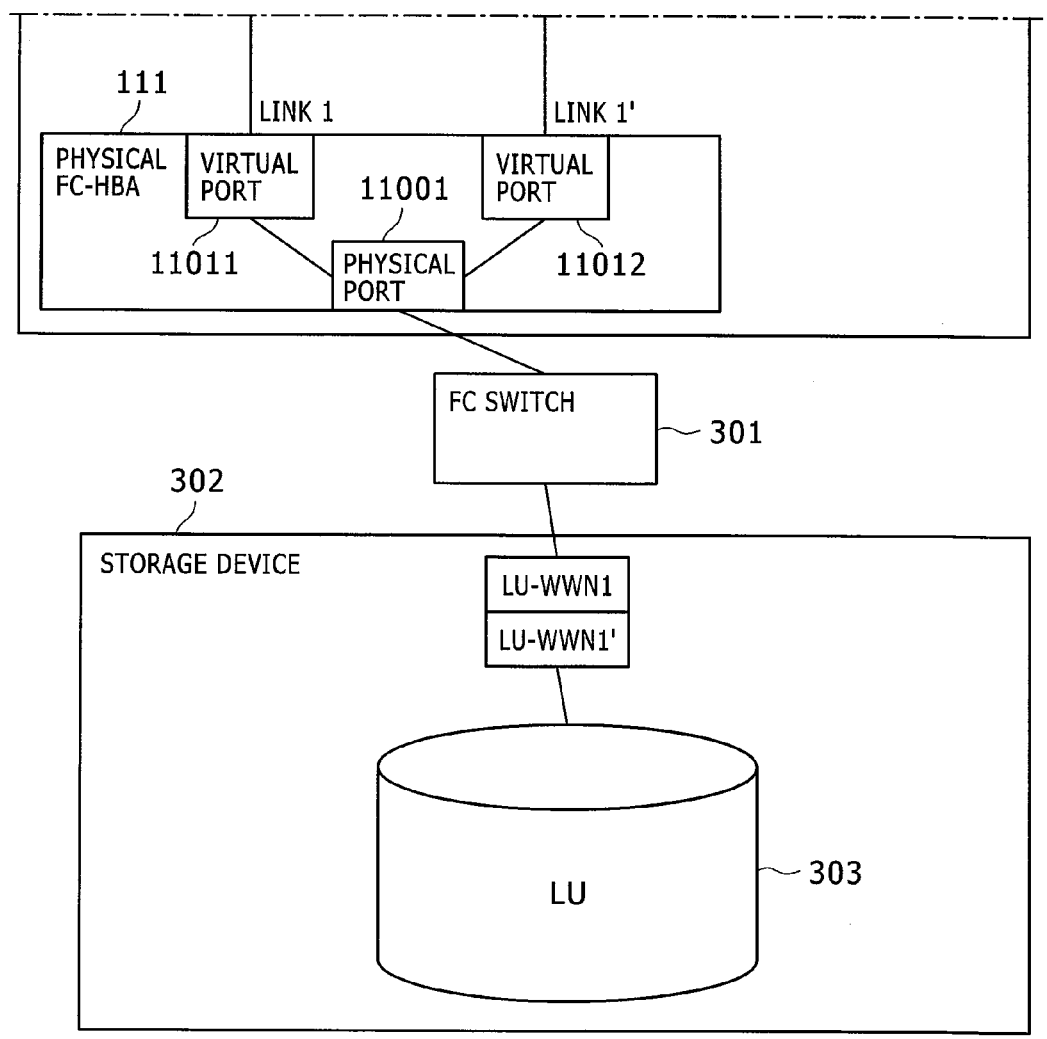
Figure 26:
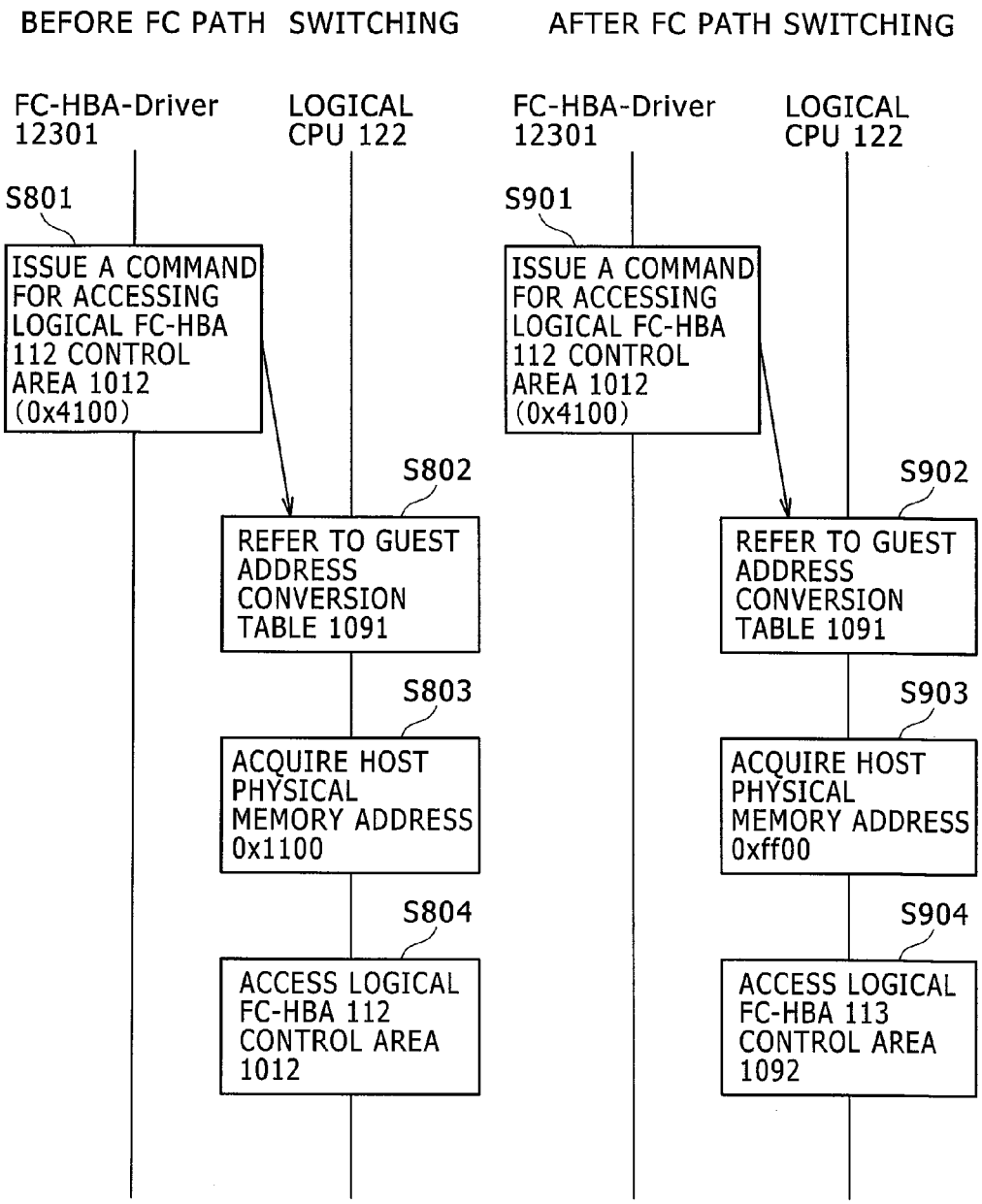
FIG. 26 shows two flowcharts-one in which a logical FC-HBA Driver accesses one logical FC-HBA control area before a FC path switching, and the other in which the same logical FC-HBA Driver accesses another logical FC-HBA control area after the FC path switching.

A disk access to the LU 303 performed by the OS 123 will be described with reference to FIG. 3, FIG. 24, FIG. 25, and FIG. 26. Here, FIG. 24 shows an FC path of the source logical FC-HBA 112. FIG. 26 shows two flowcharts-one in which a logical FC-HBA Driver accesses one logical FC-HBA control area before a FC path switching, and the other in which the same logical FC-HBA Driver accesses another logical FC-HBA control area after the FC path switching.

Before the process at step S206 is performed, the way the FC-HBA Driver 12301, which operates on the OS 123, accesses the logical FC-HBA 112 control area 1012 is as follows.

(S801) The FC-HBA Driver 12301 issues a command for accessing the logical FC-HBA 112 control area 1012 to the logical CPU 122 that is stored at the guest logical address 0x4100.

(S802) On receiving the write command to the area at the guest logical address 0x4100 from the FC-HBA Driver 12301, the logical CPU 122 refers to the guest address conversion table 1091 in order to convert the guest logical address into a host physical address.

(S803) With reference to an entry at the guest logical address 0x4100 stored in the guest address conversion table 1091, the logical CPU 122 acquires the host physical address 0x1100 corresponding to the guest logical address 0x4100.

(S804) The logical CPU 122 accesses the host physical address 0x1100 at which the logical FC-HBA 112 control area 1012 is disposed.

The FC-HBA Driver 12301, which is requested to perform disk access processing on the LU 303 by the OS 123, accesses the host physical address 0x1100 at which the logical FC-HBA 112 control area 1012 is disposed according to steps S801 to S804, and writes a disk access command in the logical FC-HBA 112 control area 1012. The logical FC-HBA firmware 11201 accesses the host physical address 0x1100 at which the logical FC-HBA 112 control area 1012 is disposed according to steps S601 to S603, reads the disk access command written in the logical FC-HBA 112 control area 1012, and performs the disk access processing. In other words, the OS 123 accesses the LU 303 via the link 1 that passes through the logical FC-HBA 112.

After the process at step S206 is performed, the way the FC-HBA Driver 12301, which operates on the OS 123, accesses the logical FC-HBA 112 control area 1012 is as follows.

(S901) A process performed at this step S901 is the same as that performed at step S801, and the FC-HBA Driver 12301 issues a command for accessing the logical FC-HBA 112 control area 1012 that is stored at the guest logical address 0x4100.

(S902) A process performed at this step S902 is the same as that performed at step S802.

(S903) With reference to an entry at the guest logical address 0x4100 stored in the guest address conversion table 1091, the logical CPU 122 acquires the host physical address 0xff00 corresponding to the guest logical address 0x4100.

(S904) The logical CPU 122 accesses the host physical address 0xff00 at which the logical FC-HBA 113 control area 1092 is disposed.

The FC-HBA Driver 12301, which is requested to perform disk access processing on the LU 303 by the OS 123, accesses the host physical address 0xff00 at which the logical FC-HBA 113 control area 1092 is disposed according to steps S901 to S904, and writes a disk access command in the logical FC-HBA 113 control area 1092. The logical FC-HBA firmware 11301 accesses the host physical address 0xff00 at which the logical FC-HBA 113 control area 1092 is disposed according to steps S701 to S703, reads the disk access command written in the logical FC-HBA 113 control area 1092, and performs the disk access processing. In other words, the OS 123 accesses the LU 303 via the link 1' that passes through the logical FC-HBA 113.

As described above, according to the virtual computer system to which the embodiment of the present invention is applied, in FC path switching processing between the-link 1 that is an FC path from the first virtual computer to the memory device and the-link 2 that is an FC path from the second virtual computer to the same memory device, the first hypervisor assigns the first' logical HBA to the first virtual computer as a dummy of the first logical HBA, and allows the login state to continue during the FC path switching with the use of the-link 1' that is an FC path from the first virtual computer to the memory device. The link 1' is established with the use of a dummy identifier (the WWN 1') given to the first' logical HBA, that is, the dummy of the first logical HBA. In this case, switching from the FC path via the link 1 to the FC path via the link 1' is performed by rewriting the address conversion table included in the first hypervisor.

Because the OS cannot operate nor recognize the hypervisor memory area, the FC path switching comes to be in the state hidden from the OS, thereby it seems as if the first logical HBA were being used during the time when the first virtual computer is being migrated just like before the migration of the first virtual computer from the viewpoint of the OS. As a result, the live migration, in which the second virtual computer takes over the operation of the first computer while the first virtual computer is being operating, can be achieved in the virtual computer system whose I/O processing mode is an I/O pass-through mode.

What is claimed is:

1. A virtual computer system comprising:
a plurality of physical computers on which virtual computers are operating, the plurality of physical computers including a first physical computer and a second physical computer; and
a memory device coupled to the first physical computer and the second physical computer via a FC (Fibre Channel) network, wherein the first physical computer includes:
a first physical HBA;
a first hypervisor that creates a first logical HBA and a second logical HBA by dividing the first physical HBA;
a first virtual computer, managed by the first hypervisor, to which the first logical HBA, having a first WWN (World Wide Name), is assigned and on which an OS operates to access the memory device via a first link that connects the first logical HBA and the memory device; and
an address conversion table that manages correspondences of guest logical addresses of the first virtual computer to host physical addresses of the first physical computer,
wherein, when the first virtual computer is migrated onto the second physical computer, the first hypervisor is configured to:
execute a logout process of the first WWN of the first logical HBA;
execute a login process of a second WWN of the second logical HBA; and
rewrite a first correspondence, where a first guest logical address of the first virtual computer corresponds to a first host physical address indicating the control area of the first logical HBA, of the address conversion table into a second correspondence, where the first guest logical address corresponds to a second host physical address indicating a control area of the second logical HBA;
wherein the OS operating on the first virtual computer accesses the memory device based on the rewritten address conversion table via a second link that connects the second logical HBA and the memory device while the first virtual computer is being migrated onto the second physical computer.

2. The virtual computer system according to claim 1, wherein
the OS operating on the first virtual computer logs in from the first logic HBA having the first WWN to the memory device via the first link before the migration,
the OS operating on the first virtual computer logs in from the second logical HBA having the second WWN to the memory device via the second link during the migration.

3. The virtual computer system according to claim 2, wherein:
the first logical HBA connects to the memory device via the first physical HBA,
the second logical HBA connects to the memory device via the first physical HBA.

4. The virtual computer system according to claim 3, wherein the OS on the first virtual computer is migrated to the second physical computer while operating and logged in to the memory device.

5. The virtual computer system according to claim 4, wherein the migration is a live migration in which the OS operating on the first virtual computer continues to operate while the first virtual computer is migrated to the second physical computer.

6. The virtual computer system according to claim 2, wherein the first hypervisor releases the connection of the first link to the memory device when the OS operating on the first virtual computer logs in to the memory device via the second link.

7. The virtual computer system according to claim 6, wherein the second physical computer includes a second hypervisor, and the second hypervisor releases the connection of the second link when the OS operates on the second physical computer after migration and logs in to the memory device via a third link.

8. The virtual computer system according to claim 1, wherein
the OS operating on the first virtual computer issues an access command to access the memory device to a first logical CPU assigned to the first virtual computer, and
while the first virtual computer is being migrated onto the second physical computer, the first logical CPU:
acquires the second host physical address, corresponding to the first guest logical address, indicating the control area of the second logical HBA by referring to the rewritten address conversion table;
accesses the acquired second host physical address; and
accesses the memory device via the second link that connects the second logical HBA corresponding to the second host physical address.

9. A control method of migrating a virtual computer in a virtual computer system having:
a plurality of physical computers on which virtual computers operating, the plurality of physical computers including a first physical computer and a second physical computer; and
a memory device being coupled to the first physical computer and the second physical computer via FC (Fibre Channel) network,
wherein the first physical computer includes:
a first physical HBA;
a first hypervisor that creates a first logical HBA and a second logical HBA by dividing the first physical HBA;
a first virtual computer, managed by the first hypervisor, to which the first logical HBA, having a first WWN, is assigned and on which an OS operates to access the memory device via a first link that connects the first logical HBA and the memory device; and
an address conversion table that manages correspondences of guest logical addresses of the first virtual computer to host physical addresses of the first physical computer, and
the control method comprising:
when the first virtual computer is migrated onto the second physical computer, executing, by the first hypervisor, a logout process of the first WWN of the first logical HBA;
executing, by the first hypervisor, a login process of a second WWN of the second logical HBA;
rewriting, by the first hypervisor, a first correspondence, where a first guest logical address of the first virtual computer corresponds to a first host physical address indicating the control area of the first logical HBA, of the address conversion table into a second correspondence, where the first guest logical address corresponds to a second host physical address indicating a control area of the second logical HBA;
accessing, by the OS operating on the first virtual computer, the memory device based on the rewritten address conversion table via a second link that connects the second logical HBA and the memory device while the first virtual computer is being migrated onto the second physical computer.

10. The control method of migrating a virtual computer according to claim 9, further comprising:
logging in, by the OS operating on the first virtual computer, from the first logic HBA having the first WWN to the memory device via the first link before the migration; and logging in, by the OS operating on the first virtual computer, from the second logical HBA having the second WWN to the memory device via the second link during the migration.

11. The control method of migrating a virtual computer according to claim 9, further comprising:

issuing, by the OS operating on the first virtual computer, an access command to access the memory device to a first logical CPU assigned to the first virtual computer, wherein, while the first virtual computer is being migrated onto the second physical computer, the first logical CPU:

acquires the second host physical address, corresponding to the first guest logical address, indicating the control area of the second logical HBA by referring to the rewritten address conversion table, accesses the acquired second host physical address, and accesses the memory device via the second link that connects the second logical HBA corresponding to the second host physical address.

12. The control method of migrating a virtual computer according to claim 9, wherein:

the first logical HBA connects to the memory device via the first physical HBA, the second logical HBA connects to the memory device via the first physical HBA.

13. The control method of migrating a virtual computer according to claim 9, wherein the OS on the first virtual computer is migrated to the second physical computer while operating and logged in to the memory device.

14. The control method of migrating a virtual computer according to claim 9, wherein the migration is a live migration in which the OS operating on the first virtual computer continues to operate while the first virtual computer is migrated to the second physical computer.

15. The control method of migrating a virtual computer according to claim 9, further comprising:

releasing, by the first hypervisor, the connection of the first link to the memory device when the OS operating on the first virtual computer logs in to the memory device via the second link.

16. The control method of migrating a virtual computer according to claim 9, wherein the second physical computer includes a second hypervisor, and further comprising:

releasing, by the second hypervisor, the connection of the second link when the OS operates on the second physical computer after migration and logs in to the memory device via a third link.

* * * * *